(12) United States Patent
Satori et al.

(10) Patent No.: US 9,212,720 B2
(45) Date of Patent: Dec. 15, 2015

(54) LIQUID SEALED VIBRATION ISOLATING DEVICE

(75) Inventors: Kazutoshi Satori, Fujimino (JP); Yukinobu Hirano, Fujimino (JP)

(73) Assignee: YAMASHITA RUBBER KABUSHIKI KAISHA, Fujimino-Shi (JP)

(*) Notice: Subject to any disclaimer, the term of this patent is extended or adjusted under 35 U.S.C. 154(b) by 116 days.

(21) Appl. No.: 13/695,900

(22) PCT Filed: May 18, 2011

(86) PCT No.: PCT/JP2011/061446
§ 371 (c)(1),
(2), (4) Date: Nov. 2, 2012

(87) PCT Pub. No.: WO2011/145656
PCT Pub. Date: Nov. 24, 2011

(65) Prior Publication Data
US 2013/0043626 A1    Feb. 21, 2013

(30) Foreign Application Priority Data

May 19, 2010   (JP) .................................. 2010-115660
May 19, 2010   (JP) .................................. 2010-115672

(51) Int. Cl.
*F16F 13/10*    (2006.01)

(52) U.S. Cl.
CPC .................................. *F16F 13/105* (2013.01)

(58) Field of Classification Search
CPC ........... F16F 13/06; F16F 13/08; F16F 13/10; F16F 13/18; F16F 13/26; F16F 13/105; F16F 13/106; F16F 13/107
USPC .............................. 267/140.13, 122, 141, 219
See application file for complete search history.

(56) References Cited

U.S. PATENT DOCUMENTS

| | | | | |
|---|---|---|---|---|
| 5,501,433 A | * | 3/1996 | Satori | 267/140.13 |
| 6,505,822 B1 | * | 1/2003 | Yamamoto et al. | 267/140.13 |
| 2001/0011790 A1 | * | 8/2001 | Satori et al. | 267/140.13 |
| 2002/0140143 A1 | * | 10/2002 | Yamamoto et al. | 267/140.13 |
| 2010/0072683 A1 | * | 3/2010 | Saito et al. | 267/140.13 |
| 2011/0101581 A1 | * | 5/2011 | Kubo et al. | 267/140.13 |

FOREIGN PATENT DOCUMENTS

| | | |
|---|---|---|
| JP | 2001-200882 | 7/2001 |
| JP | 2004-251438 | 9/2004 |
| JP | 2007-177875 | 7/2007 |
| JP | 2008-185152 | 8/2008 |

* cited by examiner

*Primary Examiner* — Anna Momper
*Assistant Examiner* — San Aung
(74) *Attorney, Agent, or Firm* — Rankin, Hill & Clark LLP

(57) ABSTRACT

A partition member for partitioning a primary liquid chamber and a secondary liquid chamber is provided with a damping orifice passage and an elastic partition member. A stopper leg portion is integrally formed with and projects from a lower wall of an elastic diaphragm portion provided in a central region of the elastic partition member 30 so as to be pressed on a pressed surface of a support wall of a frame member. A third liquid chamber is defined by the support wall, the elastic partition member and the stopper leg portion and is opened in the vicinity of a primary liquid chamber side opening of the damping orifice passage through a relief passage. The pressed surface is increased in diameter as it goes upward.

20 Claims, 24 Drawing Sheets

LIQUID SEALED VIBRATION ISOLATING DEVICE

BACKGROUND OF THE INVENTION

1. Field of the Invention

The present invention relates to a liquid sealed vibration isolating device for use in an engine mount for a motor vehicle, and more particularly, to the device which allows a hydraulic liquid passage such as a relief passage for restraining a cavitation phenomenon, to be opened and closed by utilizing the existing structure.

Further, the present invention relates particularly to the device which comprises an elastic diaphragm portion for absorbing internal pressure of a primary liquid chamber, and a stopper leg portion being integrally provided on and projecting from the elastic diaphragm portion, wherein deformation control of the elastic diaphragm portion is performed by the stopper leg portion.

2. Description of the Related Art

As a liquid sealed vibration isolating device of this type there is publicly known the device that a partition member for separating the primary liquid chamber and a secondary liquid chamber is provided with a damping orifice connecting the primary liquid chamber and the secondary liquid chamber and with a movable diaphragm for absorbing liquid pressure fluctuation of the primary liquid chamber.

Further, there is also publicly known the device that a leg portion a tip of which projects outward in a radial direction is formed on a lower surface (on the secondary liquid chamber side, and the same in the following description) of the movable diaphragm, wherein the tip of the leg portion is pressed against an inner surface of a circumferential wall provided on the support member of the movable diaphragm, and a lower portion of the circumferential wall is formed with a taper surface projecting toward the central side, so that at the time of large deformation of the movable diaphragm the leg portion is firmly compressed thereby to heighten the spring of the movable diaphragm (see a patent reference 1).

Moreover, the abrupt volume change of the primary liquid chamber creates large negative pressure (which means that the absolute value is large, and the same in the following description) within the primary liquid chamber, thereby generating bubbles in the hydraulic liquid. Then, there occurs the cavitation phenomenon which produces a noise when the bubbles burst. For restraining this phenomenon, there are provided, for example, a first orifice connecting the primary liquid chamber and the secondary liquid chamber and a second orifice connecting the secondary liquid chamber and another secondary liquid chamber which is partitioned by the movable diaphragm facing on the primary liquid chamber. When the large negative pressure is created, short-circuits are established through the second orifice and between the secondary liquid chamber and another secondary liquid chamber by the movable diaphragm which is elastically deformed to the primary liquid chamber side, so that the hydraulic liquid is allowed to flow through the second orifice and from the secondary liquid chamber to another secondary liquid chamber so as to control the negative pressure within the primary liquid chamber (see a patent reference 2).

Further, as the liquid sealed vibration isolating device of this type, there is known the one that the partition member for separating the primary liquid chamber and the secondary liquid chamber comprises the elastic diaphragm portion for absorbing the internal pressure of the primary liquid chamber, a frame member for supporting the elastic diaphragm portion, and the damping orifice which communicates between the primary liquid chamber and the secondary liquid chamber. The stopper leg portion is integrally formed on and projects from the elastic diaphragm portion. The tip of the stopper leg portion is pressed against the frame member to restrain the deformation of the elastic diaphragm, and the wall to which the tip of the stopper leg portion is pressed is formed with the taper surface. Therefore, as the displacement of the elastic diaphragm increases, the stopper leg portion is compressed by the frame member to increase the spring of the elastic diaphragm, so that the amount of the hydraulic liquid in the primary liquid chamber, which is supplied to the damping orifice passage, is increased so as to raise resonance efficiency of liquid column resonance thereby increasing the damping force (see the patent reference 1).

Patent reference 1: Japanese patent application laid open publication JP 2001-200882 A.

Patent reference 2: Japanese patent No. 4181171.

Problem to be Solved by the Invention

By the way, in the case where two orifices are provided as above and the hydraulic liquid is short-circuited through the second orifice and between the secondary liquid chamber and another secondary liquid chamber by utilizing the elastic deformation of the movable diaphragm, since the negative pressure within the primary liquid chamber is controlled indirectly through the movable diaphragm, the hydraulic liquid is required to flow directly into the primary liquid chamber from the secondary liquid chamber in order for rapidly controlling the negative pressure. Moreover, since the movable diaphragm functions as a kind of valve but is different from the one which is variable in spring in response to displacement by the provision of the leg portion like the patent reference 1, it is required to provide multifunctional capability by utilizing such existing elastic diaphragm as is adjustable in spring.

It is also required that such opening and closing structure is applicable not only to the relief passage for restraining the cavitation phenomenon but also to the opening and closing of the hydraulic fluid passage for another purpose.

Therefore, it is an object of the present invention to make it possible to open and close the passage of the hydraulic liquid by utilizing the existing movable diaphragm provided with the leg portion.

Further, in the case where the stopper portion is compressed by the taper surface of the frame member so as to increase the spring of the elastic diaphragm like the above prior art (the patent reference 1), there is a limit to the increase in compressibility of the stopper leg portion in proportion to the compression of the whole stopper leg portion consisting of elastic material such as rubber. However, if the compressibility of the stopper leg portion is able to be increased, it is possible to more increase the spring of the elastic diaphragm thereby to generate higher damping force.

Therefore, it is another object of the present invention to raise the compressibility of the stopper leg portion.

SUMMARY OF THE INVENTION

A liquid sealed vibration isolating device according to a first aspect of the present invention comprises a first mounting means being mounted on the vibration source side, a second mounting means being mounted on the vibration transmission side, a main elastic body of substantially conical shape being provided between the first and second mounting means, a liquid chamber having a portion of a wall formed with the main elastic body, a partition member for partitioning the liquid chamber into a primary liquid chamber and a secondary liquid chamber, a damping orifice passage for absorbing low frequency vibration, which communicates between the primary liquid chamber and the secondary liquid chamber, an elastic diaphragm portion being provided on at least a portion of the partition member and elastically deformable to absorb a change in the internal pressure of the primary liquid chamber, and a stopper leg portion integrally projecting from an outer circumferential portion on the secondary liquid chamber side of the elastic diaphragm portion in the direction of the secondary liquid chamber and having a projecting end to be pressed against a frame member provided for fixing a circumference of the partition member, characterized in that in addition to the damping orifice passage (14, 114, 214), a second passage (60, 160, 260) which communicates between the primary liquid chamber (12, 112, 212) and the secondary liquid chamber (13, 113, 213) is provided in the partition member (11, 111, 211), and the stopper leg portion (35, 135, 235) moves in such a way as to come in contact with and separate from the frame member (40, 140, 240) in response to the elastic deformation of the elastic diaphragm portion (31, 131, 231) and changes the second passage (60, 160, 260) into an open position to establish communication with the secondary liquid chamber (13, 113, 213) and into a closed position to cut off the communication therewith.

According to a second aspect of the present invention, the stopper leg portion (35, 135) has a substantially L-shaped cross section. The projecting end which extends in the direction orthogonal to the input direction of a principal vibration is pressed against a support wall (44, 144) of the circumferential wall of the frame member and slides in the input direction of the principal vibration. A surface of the support wall (44, 144) against which the stopper leg portion (35, 135) is pressed forms a pressed surface (47, 147). This pressed surface (47, 147) is formed with an inclined portion (57, 157) which is more expanded in diameter as it approaches the primary liquid chamber (12, 112).

According to a third aspect of the present invention, an end (53, 153) of the second passage (60, 160) on the secondary liquid chamber side is positioned to face the inclined portion (57, 157). The inclined portion (57, 157) is provided with a taper surface (55, 155) which inclines toward the end (53, 153) on the secondary liquid chamber side.

According to a fourth aspect of the present invention, a surface of the stopper leg portion (35, 135) to be pressed against the support wall (44, 144) forms a pressing surface (37a, 137a). This pressing surface (37a, 137a) is formed with a taper surface which is gradually reduced in diameter toward the secondary liquid chamber (13, 113).

According to a fifth aspect of the present invention, the pressed surface (47, 147) of the support wall (44, 144) is formed with an round-shaped portion (58, 158) which is connected continuously with the inclined portion (57, 157) and which forms a deformation restraining portion in the shape of a curved surface for the stopper leg portion (35, 135).

According to a sixth aspect of the present invention, the second passage (60, 160, 260) comprises a relief passage one end of which is opened in a region of the frame member (40, 140, 240) facing the stopper leg portion (35, 135, 235) and the other end of which is opened in the vicinity of a primary liquid chamber side opening (24, 124, 224) of the damping orifice passage (14, 114, 214). An opening of the relief passage provided on the side of the stopper leg portion (35, 135, 235) is allowed to communicate with the secondary liquid chamber (13, 113, 213) through the movement of the stopper leg portion (35, 135, 235) only when such an excessive amplitude vibration as to generate the cavitation phenomenon is inputted.

According to a seventh aspect of the present invention, an elastic partition member (30, 130, 230) comprises a third liquid chamber (61, 161, 261) which is surrounded by an outer circumferential portion (32, 132, 232) of the elastic partition member, the support wall (44, 144, 244) of the frame member (40, 140, 240) and the stopper leg portion (35, 135, 235). The second passage (60, 160, 260) communicates with the third liquid chamber (61, 161, 261).

According to an eighth aspect of the present invention, a circular rigid ring (170) which is higher in rigidity than an elastic member forming the stopper leg portion (135) is integrally implanted in the stopper leg portion (135).

According to a ninth aspect of the present invention, the frame member (240) is provided with the support wall (244) which is formed on the outer circumferential side of the stopper leg portion (235) and with a stopper wall (259) which extends in the central direction at right angles to the input direction of a principal vibration. The stopper leg portion (235) moves in the input direction of the principal vibration in response to the elastic deformation of the elastic diaphragm portion (231) so as to come in contact with and separate from the stopper wall (259).

According to a tenth aspect of the present invention, a seal rib (280) is integrally formed on a surface of the stopper leg portion (235) facing the stopper wall (259), so as to project toward the stopper wall (259).

Effects of the Invention

According to the first aspect of the present invention, since the stopper leg portion (35, 135, 235) moves relative to the frame member (40, 140, 240) in response to the elastic deformation of the elastic diaphragm portion (31, 131, 231) and changes the second passage (60, 160, 260) into the open position to establish communication with the secondary liquid chamber (13, 113, 213) and into the closed position to cut off the communication therewith, the second passage (60, 160, 260) can be easily opened and closed, and such opening and closing structure can be easily formed by utilizing the existing elastic diaphragm (31, 131, 231) and stopper leg portion (35, 135, 235).

In addition, the existing stopper leg portion (35, 135, 235) can easily function as an opening and closing valve for the second passage (60, 160, 260), and the functions of changing the spring in response to the displacement and making variable the internal pressure absorption capacity against the internal pressure change of the primary liquid chamber (12, 112, 212) can be performed by the provision of the stopper leg portion (35, 135, 235), whereby the elastic diaphragm portion (31, 131, 231) can have the multifunctional capability.

According to the second aspect of the present invention, since the pressed surface (47) of the support wall (44) is formed with the inclined portion (57, 157) which is more expanded in diameter the more it approaches the primary liquid chamber (12, 112), the stopper leg portion (35, 135) changes in a compression amount due to press reaction force from the inclined portion (57, 157) in proportion to the size of displacement of the elastic diaphragm portion (31, 131), that is, the amplitude of the input vibration.

Further, since the support wall (44, 144) is increased in diameter as it approaches the primary liquid chamber (12, 112), a gap is easily created between the inclined portion (57, 157) of the support wall (44, 144) and the stopper leg portion (35, 135), and the position in which the gap is created can be used as the open position of the stopper leg portion (35, 135). Accordingly, the second passage (60, 160) can be opened and closed by the movement of the stopper leg portion (35, 135) in proportion to the amplitude of the input vibration.

According to the third aspect of the present invention, the end (53, 153) of the second passage (60, 160) on the secondary liquid chamber side is positioned to face the inclined portion (57, 157), and the taper surface (55, 155) which inclines toward the end (53, 153) on the secondary liquid chamber side is provided on the inclined portion (57, 157). Therefore, the flow resistance of the hydraulic liquid flowing into the second passage (60, 160) can be lowered.

According to the fourth aspect of the present invention, since the surface of the stopper leg portion (35, 135) to be pressed against the support wall (44, 144) forms the pressing surface (37a, 137a) comprising the taper surface which is gradually reduced in diameter toward the secondary liquid chamber (13, 113), the contact with the pressed surface (47, 147) of the support wall (44, 144) can be increased. Therefore, since the deformation of the stopper leg portion (35, 135) is restrained to prevent the displacement of the elastic diaphragm portion (31, 131), the volume of the hydraulic liquid flowing into the damping orifice (14, 114) can be increased to make the liquid column resonance larger thereby realizing the high damping.

According to the fifth aspect of the present invention, the pressed surface (47, 147) of the support wall (44, 144) is formed with the round-shaped portion (58, 158) which is connected continuously with the inclined portion (57, 157) and which forms the deformation restraining portion in the shape of a curved surface for the stopper leg portion (35, 135). Therefore, when the large amplitude vibration is inputted, the stopper leg portion (35, 135) slides on the round-shaped portion (58, 158) to abruptly change nonlinearly the compression amount due to the press reaction from the round-shaped portion (58, 158), thereby restraining the deformation of the elastic diaphragm portion (31, 131), so that the volume of the hydraulic liquid flowing into the damping orifice passage (14, 114) can be further increased and the liquid column resonance can be further enlarged thereby making it possible to realize the higher damping.

According to the sixth aspect of the present invention, the second passage (60, 160, 260) is used as the relief passage. Therefore, only when the large negative pressure is developed in the primary liquid chamber (12, 112, 212) by the input of the excessive amplitude vibration, the hydraulic liquid is allowed to flow into the primary liquid chamber (12, 112, 212) through the second passage (60, 160, 260) forming the relief passage so as to rapidly reduce the negative pressure of the primary liquid chamber (12, 112, 212), thereby enabling the cavitation phenomenon to be restrained.

Further, since the end of the second passage (60, 160, 260) forming the relief passage is provided in the vicinity of the primary liquid chamber side opening (24, 124, 224) of the damping orifice passage (14, 114, 214), the hydraulic liquid flowing from the second passage (60, 160, 260) to the primary liquid chamber (12, 112, 212) is allowed to smoothly pass at lower resistance by opening the end of the second passage (60, 160, 260) forming the relief passage, in the vicinity of the opening (24, 124, 224). Moreover, since it is possible to utilize the existing damping orifice (14, 114, 214) and primary liquid chamber side opening (24, 124, 224) thereof, the second passage (60, 160, 260) can be easily formed. In addition, the third liquid chamber (61) can be easily formed by utilizing the existing stopper leg portion (35, 135, 235), and the second passage (60, 160, 260) can be formed with a little alteration.

Then, by the application of the structure described in the second aspect, a gap is created between the stopper leg portion (35, 135, 235) and the inclined portion (57, 157) by the displacement of the elastic diaphragm portion (31, 131, 231) to be elastically deformed toward the primary liquid chamber (12, 112, 212) at the time of inversion to the negative pressure side after the excessive amplitude vibration is inputted. Thus, the gap establishes the communication with the secondary liquid chamber (13, 113). In this occasion, a large amount of hydraulic liquid is allowed to flow from the secondary liquid chamber (13, 113) through the relief passage (60) to the primary liquid chamber (12, 112, 212) thereby enabling the cavitation phenomenon to be prevented more remarkably.

Further, by the application of the structure described in the third aspect, one end (53) of the relief passage (60, 160, 260) faces the inclined portion (57), and the taper surface (55) inclined toward this one end (53) is provided on the inclined portion (57), whereby the flow resistance of the hydraulic liquid flowing into the second passage (60, 160) from the secondary liquid chamber (13) can be lowered thereby to raise the cavitation phenomenon restraining effect.

According to the seventh aspect of the present invention, since the third liquid chamber (61, 161, 261) is able to be provided by forming the stopper leg portion (35, 135, 235) on the elastic partition member (30, 130, 230), when allowing the second passage (60, 160, 260) to communicate with this third liquid chamber (61, 161, 261) and when opening and closing between the support wall (44, 144, 244) and the stopper leg portion (35, 135, 235), it is possible to connect and disconnect the second passage (60, 160, 260) and the secondary liquid chamber (13, 113, 213) via the third liquid chamber (61, 161, 261). In addition, in comparison with the case where the second passage (60, 160, 260) is directly connected to the secondary liquid chamber (13, 113, 213), a degree of freedom relative to the opening position of the second passage (60, 160, 260) is improved, and since the opening and closing operation between the support wall (44, 144, 244) and the stopper leg portion (35) is able to be performed by a full circumference or any circumferential portion of the stopper leg portion (35, 135, 235), a degree of freedom on the opening and closing structure of the third liquid chamber (61, 161, 261) relative to the secondary liquid chamber (13, 113, 213) is also improved.

According to the eighth aspect of the present invention, since the circular rigid ring (170) which is higher in rigidity than the elastic member forming the stopper leg portion (135) is integrally implanted in the stopper leg portion (135), when the large vibration is inputted, the stopper leg portion (135) is compressed so as to restrain the deformation of the elastic diaphragm portion (131). At that time, since the compression of the stopper leg portion (135) is performed at a less volume portion of the elastic member which is an end portion (137a) located in front of the rigid ring (170) of the stopper leg portion (135), whereby the compressibility can be raised.

Therefore, the spring of the elastic diaphragm portion (131) can be increased thereby to send a larger amount of the hydraulic liquid within the primary liquid chamber (112) to the damping orifice passage (114), so that the resonance efficiency can be improved so as to realize the high damping.

According to the ninth aspect of the present invention, the frame member (240) is provided with the support wall (244) which is formed on the outer circumferential side of the stopper leg portion (235) and with the stopper wall (259) which extends in the central direction at right angles to the input direction of a principal vibration, and the stopper leg portion (235) moves in the input direction of the principal vibration in response to the elastic deformation of the elastic diaphragm portion (231) so as to come in contact with and separate from the stopper wall (259). Therefore, the connection and disconnection between the second passage (260) and the secondary liquid chamber (213) can be performed by the stopper wall (259) and the surface of the stopper leg portion (135) opposed thereto. Thus, the opening and closing valve structure between the second passage (260) and the secondary liquid chamber (213) becomes simple and the operation becomes reliable.

According to the tenth aspect of the present invention, since the seal rib (280) is integrally formed on the surface of the stopper leg portion (235) facing the stopper wall (259) so as to project toward the stopper wall (259), the seal can be surely performed when the stopper leg portion (235) is pressed on the stopper wall (259).

DETAILED DESCRIPTION OF THE EMBODIMENT

Figure 1:
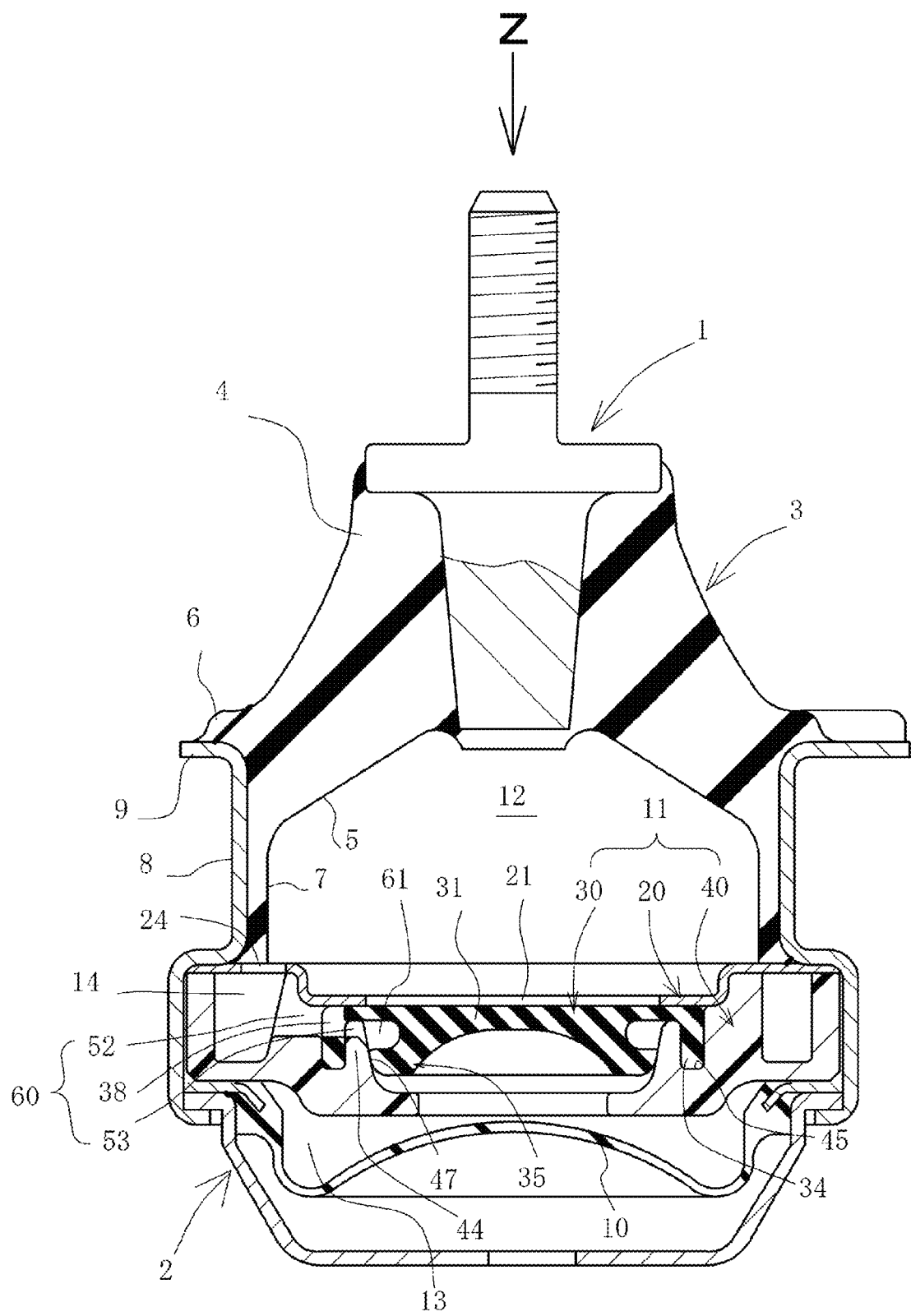
FIG. 1 is a cross sectional view of an engine mount according to a first embodiment of the present invention.
Figure 2:
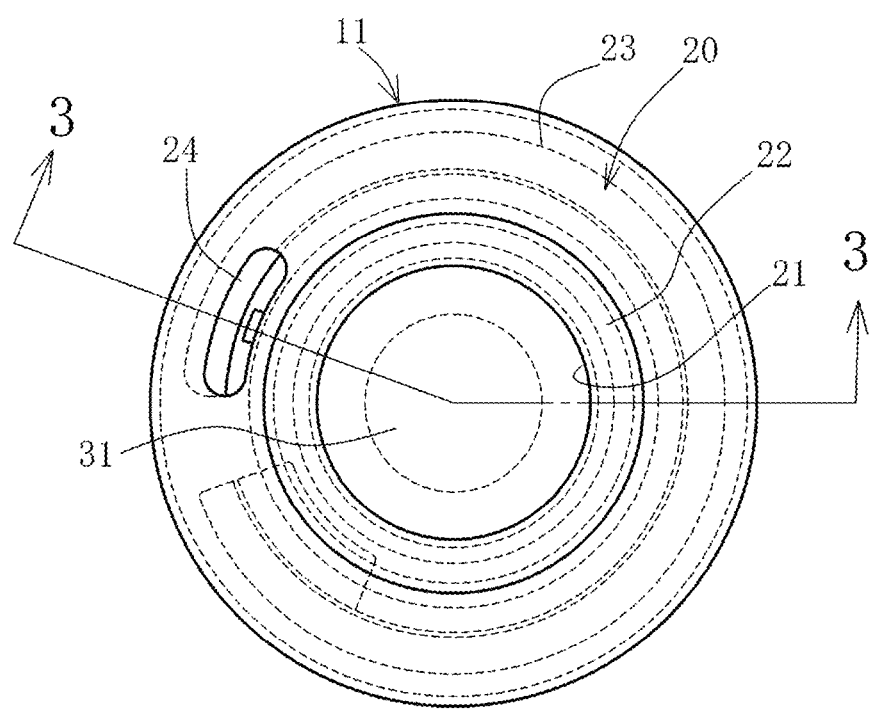
FIG. 2 is a plan view of a partition member.
Figure 3:
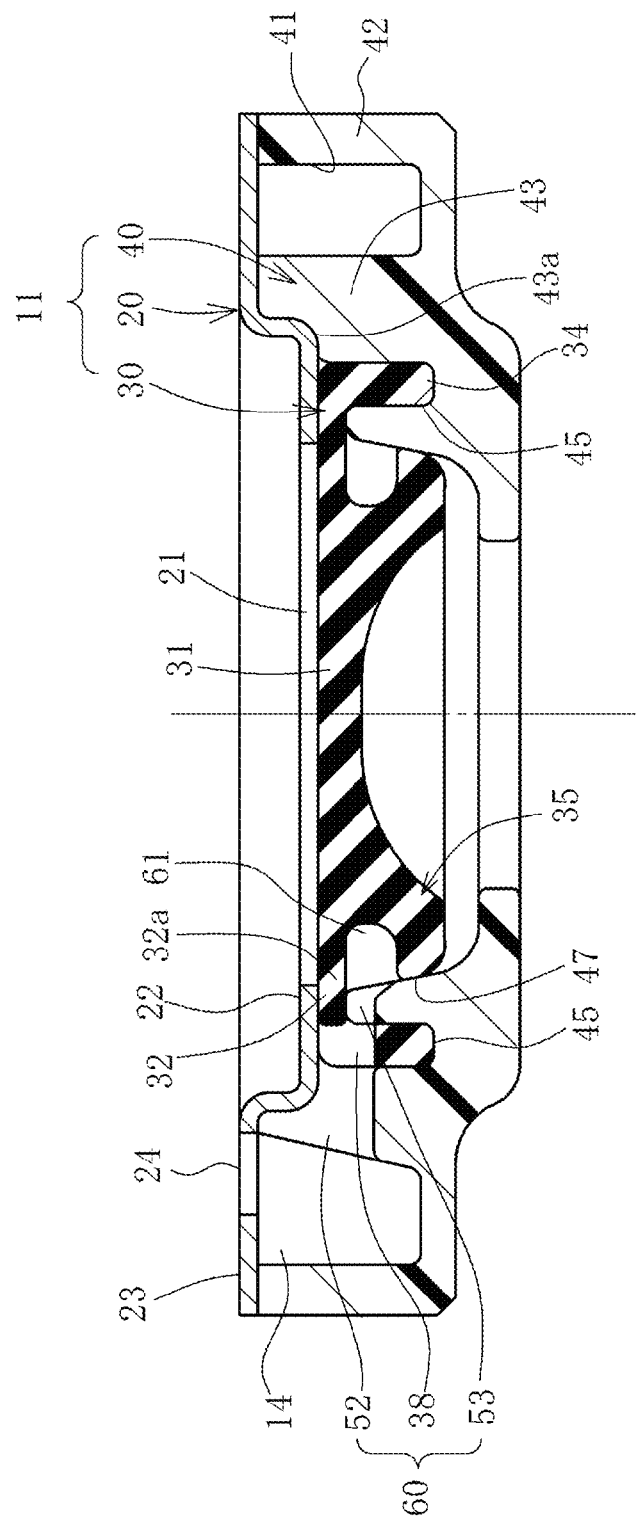
FIG. 3 is a cross sectional view taken along line 3-3 of FIG. 2.
Figure 4:
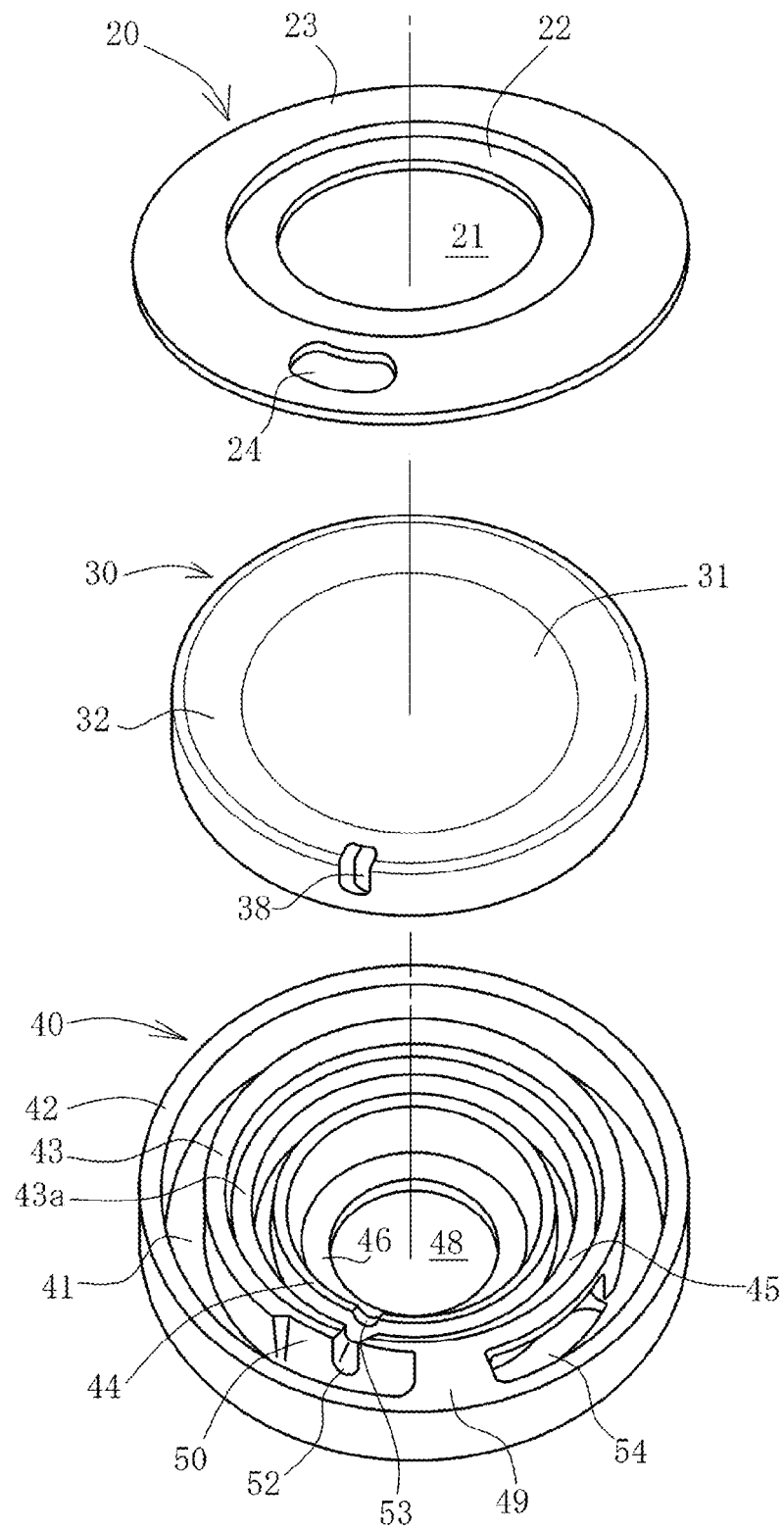
FIG. 4 is an exploded perspective view of the partition member, showing each of component elements in a perspective view.
Figure 5:
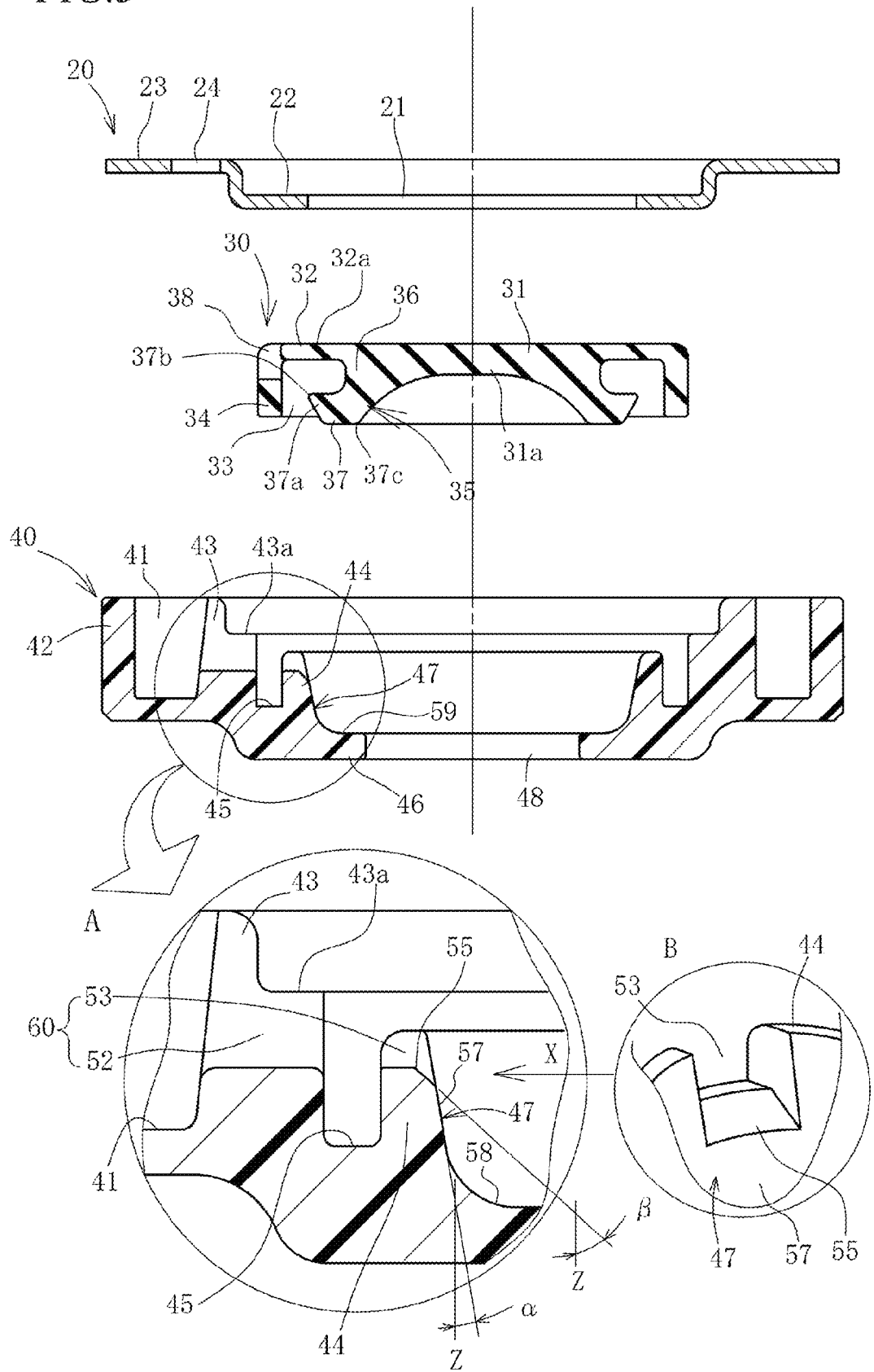
FIG. 5 is an exploded cross sectional view of the partition member showing each of component elements in a cross section.
Figure 6:
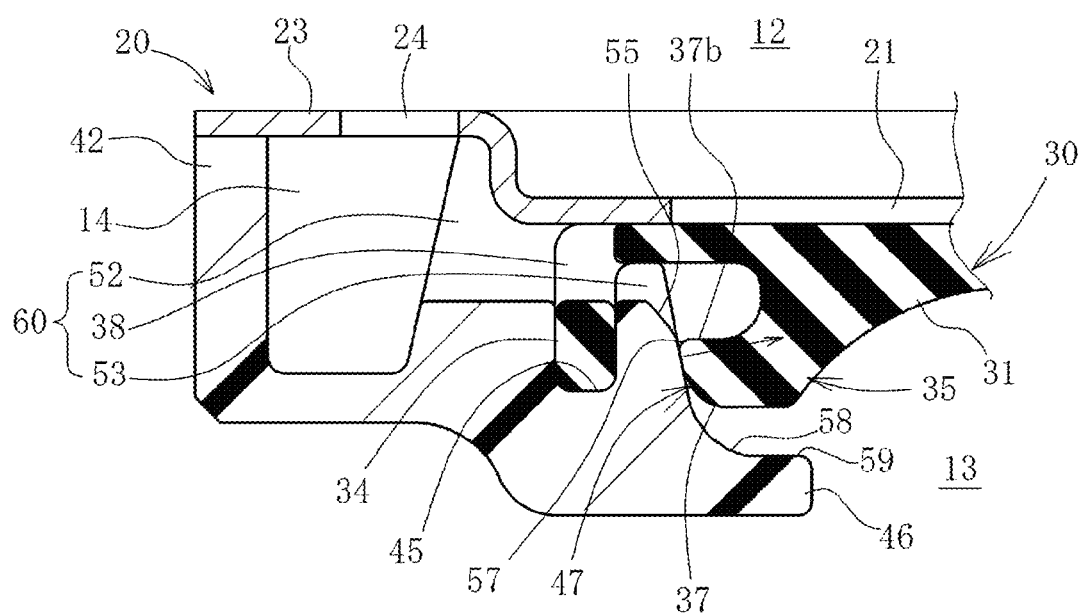
FIG. 6 is an explanatory view of the operation in a normal condition.
Figure 7:
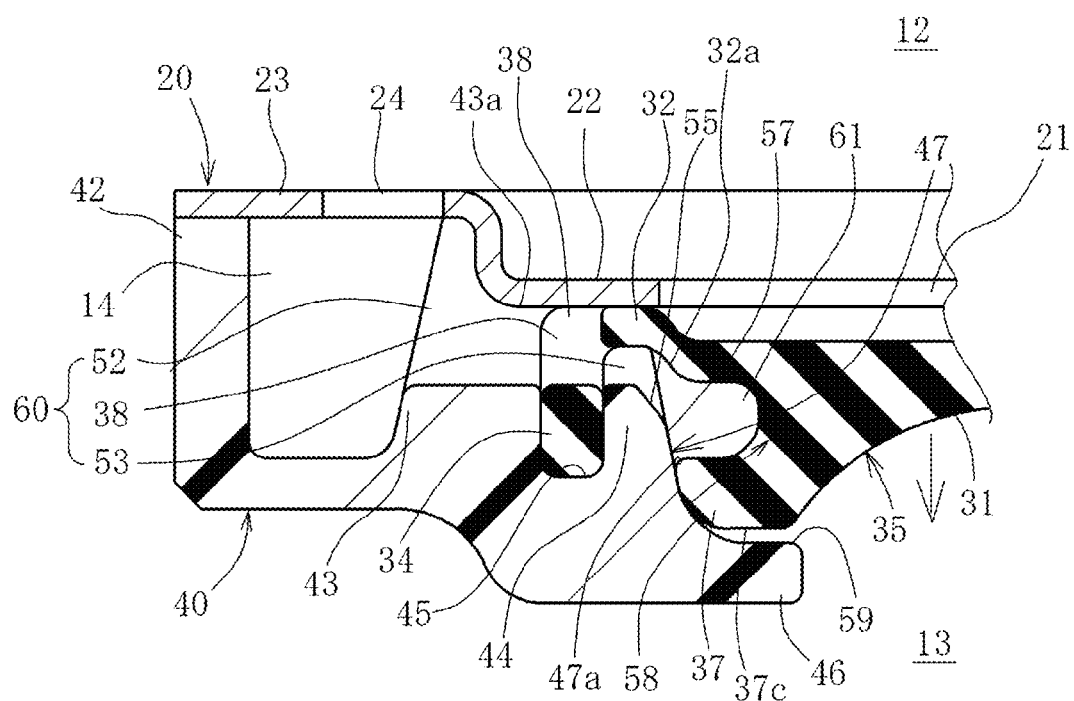
FIG. 7 is an explanatory view of the operation when a comparatively large load is applied in a normal condition.
Figure 8:
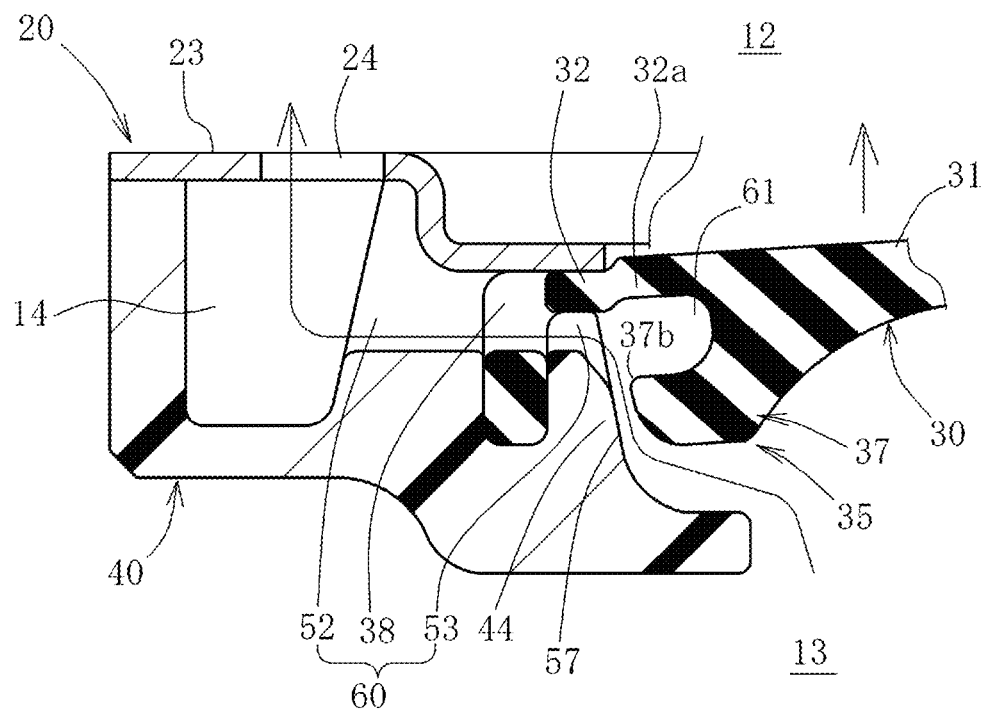
FIG. 8 is an explanatory view of the operation when a minus vibration of excessive amplitude is applied.

Hereinafter, embodiments of the present invention configured as an engine mount for a motor vehicle will be described with reference to the accompanying drawings. At first, a first embodiment will be described with reference to FIGS. 1 through 8. FIG. 1 is a cross sectional view taken along a central axis (parallel to the direction of an arrow Z) of the engine mount. FIG. 2 is a plan view of a partition member. FIG. 3 is a cross sectional view taken along line 3-3 of FIG. 2. FIG. 4 is an exploded perspective view of the partition member. FIG. 5 is an exploded cross sectional view of the partition member. FIGS. 6 through 8 are explanatory views of the operation. In the description hereunder, an upper and lower sides of a liquid sealed vibration isolating device and of each component element thereof are set on the basis of the state illustrated in FIG. 1, wherein an upper side designates a primary liquid chamber side and a lower side designates a secondary liquid chamber side with respect to the partition member, and similarly an inside designates a central side of the device (the same basis will be applied in other embodiments).

In FIG. 1, this engine mount comprises a first mounting member 1 mounted on the side of an engine as a vibration source, a second mounting member 2 mounted on the side of a vehicle body as a vibration transmitted side, and an elastic main body 3 configured to connect the first and second mounting members and to be integrally combined with them. The elastic main body 3 is a member in the shape of a substantially circular cone formed of a publicly known elastic material such as rubber or the like. On the top of this circular cone portion 4 the first mounting member 1 is integrally implanted.

An inside surface 5 of the circular cone portion 4 forms an internal wall facing a liquid chamber to be described later. The circumference of a hem portion of the circular cone portion 4 is formed with a flange 6. A lower portion below the flange 6 extends further downwardly to form a lining portion 7. The flange 6 is integrally combined with a flange 9 of a cylindrical side wall portion 8 which forms a part of the second mounting member 2. The lining portion 7 covers an internal wall of the side wall portion 8.

The inside of the elastic main body 3 defines a downwardly open space and this open space is closed with a diaphragm 10 thereby to form a liquid chamber inside thereof. This liquid chamber is divided by a partition member 11 into a primary liquid chamber 12 on the side of the elastic main body 3 and a secondary liquid chamber 13 on the side of the diaphragm 10. These liquid chambers are communicated with each other by a damping orifice passage 14 for absorbing low frequency vibrations, which is formed in an outer circumferential portion of the partition member 11. In the present invention, the low frequency designates a region of about 5~30 Hz, and a frequency higher than that region is referred to as an intermediate or high frequency. An input direction Z of a principal vibration to be inputted to the engine mount extends from the first mounting member 1 to the primary liquid chamber 12 in parallel to an axis of the first mounting member 1 and is orthogonal to a surface of the partition member 11 facing the primary liquid chamber 12.

The partition member 11 is formed with three components comprising a cover member 20, an elastic partition member 30 of a proper elastic material such as rubber or the like, and a substantially cup shaped frame member 40 for supporting the elastic partition member 30. The cover member 20 functions as a lid to be put on the elastic partition member 30. A central opening 21 is formed in a central region of the cover member 20. Around the central opening 21 there is formed a step portion 22 which is lowered one step below an outer circumferential side. An opening 24 of the damping orifice passage 14 on the side of the primary liquid chamber 12 is provided on an outer circumferential portion 23 located on the outer circumferential side of the step portion 22.

The elastic partition member 30 comprises a central portion forming a thin elastic diaphragm portion 31, an outer circumferential portion 32 located on the circumferential side of the central portion and forming a ring shaped groove 33 which is opened downwardly by being carved from the bottom side thereof, a circumferential wall 34 located on the outer circumferential side across the ring shaped groove 33, and a stopper leg portion 35 of a substantially L-shaped cross section located on the inner circumferential side of the ring shaped groove 33.

The elastic diaphragm portion 31 faces the primary liquid chamber 12 through the central opening 21 of the cover member 20 and forms a portion which is capable of being elastically deformed enough to absorb the change of internal pressure of the primary liquid chamber 12 in proportion to the elastic deformation of the elastic main body 3. The lower wall of the elastic diaphragm portion 31 is formed with a concave curved surface 31a which is curved upward, while the upper wall thereof is formed with a substantially flat surface. Therefore, the elastic diaphragm portion 31 is thinnest at the center thereof and is gradually thickened toward the outer circumferential side to be connected with the stopper leg portion 35.

The stopper leg portion 35 is integrally formed continuously with the outer circumference of the elastic diaphragm portion 31 on the bottom side of the elastic partition member 30 and has a substantially L-shaped cross section comprised of a neck portion 36 which is connected with the outer circumferential portion 32 and of a pressing portion 37 which projects outward from the neck portion 36 in the direction orthogonal to the principal vibration input direction Z. The pressing portion 37 has an outer circumferential surface forming a taper shaped seal surface 37a inclined in such a state as to gradually approach the center side as it goes downward. The upper end of the pressing portion 37 is formed with a seal rib 37b which projects most outwardly. A lower surface 37c of the pressing portion 37 is a substantially horizontal flat surface.

By forming the seal surface 37a on the pressing portion 37, the stopper leg portion 35 comes in surface contact with a support wall 44 to be described later and slides substantially in the principal vibration input direction Z, so that the stopper leg portion 35 is compressed thereby to increase the spring of the elastic diaphragm portion 31. The support wall 44 corresponds to a circumferential wall in the present invention on which the stopper leg portion 35 is pressed. However, the seal surface 37a of the pressing portion 37 separates from the support wall 44 in a specific case. Namely, the pressing portion 37 is so configured as to come in contact with and separate from the support wall 44. The seal rib 37b is an annular rib which projects all around the outer circumferential surface of the pressing portion 37, and is configured to provide sealing between the pressing portion 37 and the support wall 44 by being pressed on and compressed by the support wall 44. A degree of the sealing is adjustable by adjusting an interference of the seal rib 37b. When each of tolerances of the pressing portion 37 and the support wall 44 is ±0.1 mm, the interference of the seal rib 37b may be adjusted to about 0.2~0.3 mm, for example.

The ring shaped groove 33 has an annular space of a substantially inverted L-shape in cross section an upper portion of which extends radially inward above the pressing portion 37 to form an extension which the neck portion 36 faces. The ring shaped groove 33 is surrounded with the outer circumferential portion 32, the circumferential wall 34 and the stopper leg portion 35 and communicates through a communication orifice 38 with an outer space external to the circumferential wall 34 and the outer circumferential portion 32. The communication orifice 38 is formed by cutting out a part of a shoulder portion comprised of a joining portion between the upper end of the circumferential wall 34 and the outer circumference of the outer circumferential portion 32.

A frame member 40 is formed of a metal such as a light alloy, etc. or a proper rigid material such as resin, etc. In the outer circumferential region of the frame member 40 an upward open annular groove 41 is formed between an outer circumferential wall 42 and an inner circumferential wall 43 opposed thereto to constitute the orifice passage 14 in cooperation with the cover member 20. The annular support wall 44 is formed on the inside of the inner circumferential wall 43 with a space left from the latter. Between this support wall 44 and the inner circumferential wall 43 is provided an upward open annular support groove 45. An upper end of the support wall 44 is lower than a step 43a which is formed on the inner circumferential side of an upper end region of the inner circumferential wall 43. A bottom portion 46 on the inside of the support wall 44 is formed one step lower than the bottom on the outer circumferential side thereof. An inner circumferential wall of the support wall 44 extends below a bottom of the support groove 45 so as to form a pressed surface 47. A central opening 48 is provided in a central region of the bottom portion 46.

As shown in FIG. 4, the annular groove 41 is not formed on a full circumference, and both ends in the circumferential direction are separated by a connecting portion 49 which partially connects the outer circumferential wall 42 and the inner circumferential wall 43. On the side of one end of the annular groove 41, there is formed a thin-walled portion 50 which is partially depressed inward by shaving the outer circumferential side of the inner circumferential wall 43. An outer communication groove 52 is provided by partially cutting out an upper end wall of the thin-walled portion 50. Moreover, an inner communication groove 53 of a cutout shape is also provided in an upper end region of the support wall 44 in such a way as to correspond to the outer communication groove 52 in the radial direction. Thus, the annular groove 41 and the central opening 48 are allowed to communicate with each other through the outer communication groove 52 and the inner communication groove 53. The inner communication groove 53 corresponds to a third liquid chamber side end of a relief passage 60 in the present invention.

The other end of the annular groove 41 communicates with an secondary liquid chamber side opening 54 formed on the bottom of the annular groove 41.

As shown in an enlarged illustration A of FIG. 5 and in an enlarged illustration B thereof viewed in the direction of arrow X of the enlarged illustration A, a bottom of the outer communication groove 52 has the same height with a bottom of the inner communication groove 53. A taper shaped concave 55 communicating with a bottom of the inner communication groove 53 is provided on the inner circumferential surface of the support wall 44 which is opposite to the stopper leg portion 35. This taper shaped concave 55 is formed in such a way as to be curved from the side of the pressed surface 47 forming the inner circumferential surface of the support wall 44 to the outer circumferential side. An upper end of the taper shaped concave 55 is connected with the bottom of the inner communication groove 53 while a lower end thereof is flush with an upper portion of the inner circumferential surface of the support wall 44. Further, a bottom of the taper shaped concave 55 is formed with a taper surface which inclines downwardly in the direction of the pressed surface 47.

The upper portion of the pressed surface 47 inclines more steeply than the taper surface of the taper shaped concave 55 and is formed with an inclined portion 57 comprised of an inclined surface extending downwardly in the central direction on the lower side thereof, while the lower portion of the pressed surface 47 is formed with an round-shaped portion 58 comprised of a round curved surface. The inclined portion 57 extends toward the central side of the elastic diaphragm portion 31 as it nears the lower end and is formed with the inclined surface of an angle α relative to the principal vibration input direction Z. When an angle of the taper surface of the taper shaped concave 55 relative to the principal vibration input direction Z is β, there is expressed α<β.

Namely, the inclined portion 57 inclines in such a way as to converge at the center as it goes downward in FIG. 1. In other words, the support wall 44 is formed in a cylindrical shape, and the inclined portion 57 is formed in such a condition that while the inner circumferential surface of the support wall 44 has a certain degree of vertical width allowing the stopper leg portion 35 to slide in parallel to the principal vibration input direction Z, an internal diameter of a circular space formed by the inner circumferential wall 43 decreases with going downward in the drawing. However, each of sizes of the angle α and angle β can be freely selected in accordance with the purpose while maintaining the relation of α<β.

A lower portion below the pressed surface 47 is formed with a stopper wall 59 extending continuously from the R-shaped portion 58. An upper surface of the stopper wall 59 is a substantially horizontal flat surface parallel to the lower surface 37c of the pressing portion 37 and extends in the central direction so as to form an upper surface of the bottom portion 46 around the central opening 48. The pressed surface 47 comprises the inclined portion 57, the R-shaped portion 58 and the stopper wall 59. The pressed surface 47 is configured to receive the pressing stopper leg portion 35 and to compress the stopper leg portion 35 by press reaction force from the pressed surface 47 while changing the amount of compression. As a consequence, when the compression amount is increased, the spring of the elastic diaphragm portion 31 is heightened thereby to restrain the free elastic deformation of the elastic diaphragm portion 31, so that the pressed surface 47 forms a deformation restraining portion of the elastic diaphragm portion 31.

By the way, this deformation restraining portion fractionalizes the function in accordance with an amount of displacement at the stopper leg portion, that is, the amplitude of the input vibration. The stopper leg portion 35 slides on the inclined portion 57 at the time of small amplitude and on the R-shaped portion 58 at the time of large amplitude. Further, at the time of excessive amplitude, it comes in contact with the stopper wall 59 on the side of a positive pressure and moves onto or above the taper shaped concave 55 on the side of negative pressure. Incidentally, in the present invention, the vibration on the positive pressure side is also referred to as plus (+) vibration, and the vibration on the negative pressure side is also referred to as minus (−) vibration.

Further, the small amplitude is the amplitude of such a level that the change of the spring is able to be expressed in a linear shape, and the large amplitude is the amplitude of such a level that there is the necessity to express the change of the spring in a non-linear shape. Moreover, the excessive amplitude is such amplitude greater than the large amplitude that the movement of the stopper leg portion 35 needs to be stopped at the time of the positive pressure. The excessive amplitude is the vibration of such a level as to create the cavitation phenomenon under normal conditions.

While these small amplitude, large amplitude and excessive amplitude are determined relatively according to the purpose, the excessive amplitude is considered in certain cases as the vibration of the amplitude exceeding ±2.0 mm, for example.

Furthermore, with respect to the conditions of the input vibration, the case where the vibration of the small or large amplitude is inputted is referred to as the normal condition, and the case where the vibration of the excessive amplitude is inputted is referred to as the abnormal condition. The vibration of the abnormal condition is apt to occur in the case where the vehicle runs onto a step, etc.

As shown in FIGS. 4 and 5, when the elastic partition member 30 is put on the frame member 40 so as to allow the circumferential wall 34 to be engaged with the support groove 45 and then the cover 20 is put on the elastic partition member 30, these three components are combined and assembled into the partition member 11 as shown in FIGS. 2 and 3.

In this assembled state, as shown in FIG. 3, the circumferential wall 34 of the elastic partition member 30 is fitted into the support groove 45 and fixed by allowing the upper end of the elastic partition member 30 to be held in place by the step portion 22 of the cover member 20. Also, the stopper leg portion 35 is fitted on the inner circumferential side of the support wall 45, whereby the pressing portion 37 is pressed against the pressed surface 47.

The annular groove 41 is closed on the upper side thereof with the outer circumferential portion 23 of the cover member 20 thereby to form the damping orifice passage 14. This damping orifice passage 14 communicates through the opening 24 with the primary liquid chamber 12 and also communicates through the opening 54 (see FIG. 4) with the secondary liquid chamber 13. Moreover, the outer communication groove 52 and the inner communication groove 53 are connected continuously through the communication orifice 38 provided on the shoulder portion of the circumferential wall 34 of the elastic partition member 30, thereby to form the relief passage 60. The relief passage 60 establishes the communication between the damping orifice passage 14 and a third liquid chamber 61 formed by the ring shaped groove 33.

Further, in the inside region of the shoulder portion of the circumferential wall 34 of the elastic partition member 30, the outer circumferential portion 32 is held between the step portion 22 of the cover member 20 and the upper end portion of the support wall 44. The step portion 22 is positioned on the step portion 43a of the inner circumferential wall 43. An inner circumferential edge of the step portion 22 facing the central opening 21 and the upper end portion of the support wall 44 are located substantially on the same position, and a portion of the outer circumferential portion 32 located on the inside of these components forms a thin unrestricted portion 32a. This unrestricted portion 32a is easily elastically deformed so that the elastic diaphragm portion 31 located on the inner circumferential side is capable of being elastically deformed.

The stopper leg portion 35 and the elastic diaphragm portion 31 are positioned inside the central opening 21. The elastic diaphragm portion 31 faces the primary liquid chamber 12 directly and the internal pressure of the primary liquid chamber 12 is directly transmitted to the elastic diaphragm portion 31 so that the elastic diaphragm portion 31 is elastically deformed to absorb a rise in the hydraulic pressure of the primary liquid chamber 12. The lower surface of the elastic diaphragm portion 31 faces the secondary liquid chamber 13 through the central opening 48 as well. The stopper leg portion 35 is positioned above the stopper wall 59 to overlap with each other in the vertical direction.

The third liquid chamber 61 is designated as the third liquid chamber when the primary liquid chamber 12 and the secondary liquid chamber 13 are referred to as the first and second liquid chambers, respectively. The third liquid chamber 61 is an annular liquid chamber which is surrounded by the inner circumferential surface of the support wall 44 engaged with the ring shaped groove 33, the outer circumferential portion 32 of the elastic partition member 30 and the stopper leg portion 35 so as to be formed continuously on the circumference of the elastic partition member 30 in the circumferential direction thereof. The third liquid chamber 61 communicates with the primary liquid chamber 12 through the relief passage 60 and the damping orifice passage 14, while it does not communicate with the secondary liquid chamber 13 in the normal condition since the stopper leg portion 35 is pressed against the pressed surface 47 so as to close and cut off the communication.

The illustrated condition in FIGS. 3 and 6 is an unloaded condition in which a load from the primary liquid chamber 12 is not applied to the elastic partition member 30. In this condition, the pressing portion 37 of the stopper leg portion 35 is pressed on and comes in close contact with the pressed surface 47, and the seal rib 37b (see FIGS. 5 and 8) seals the secondary liquid chamber 13, whereby there is ensured a closed condition between the pressing portion 37 and the pressed surface 47. Then, in the normal condition, that is, in the case where the input vibration is the one of the small amplitude or the large amplitude within such an input range of the predetermined size that there is no special requirement for restraining the cavitation phenomenon, the pressing portion 37 is configured to be positioned below the lower end of the taper shaped concave 55.

Therefore, the up and down vibration of the elastic diaphragm portion 31 in the normal condition allows the pressing portion 37 to slide up and down merely on the lower portion of the pressed surface 47 located below the lower end of the taper shaped concave 55 while maintaining the sealed condition. Then, since the pressed surface 47 extends inward as the pressing portion 37 moves downward, the pressing portion 37 is pressed firmly in the central direction of the elastic diaphragm portion 31 to heighten the spring, so that the spring of the elastic diaphragm portion 31 can be increased nonlinearly thereby to heighten the damping when the large amplitude vibration is inputted.

Next, the operation of this embodiment will be described. When the vibration is inputted and the internal pressure of the primary liquid chamber 12 is fluctuated by the elastic deformation of the elastic main body 3, the elastic diaphragm portion 31 is elastically deformed to absorb the fluctuation of the internal pressure. Then, as shown in FIG. 6, the stopper leg portion 35 is deformed together with the elastic diaphragm portion 31, and the seal rib 37b forming the forward end of the pressing portion 37 is pressed on the inclined portion 57 in the direction substantially orthogonal to the inclined surface.

In this condition, at the time of the normal condition in which the amplitude of the input vibration is comparatively small, the pressing portion 37 slides up and down on the inclined portion 57 in the position below the lower end of the taper shaped concave 55. Then, the spring constant of the elastic diaphragm portion 31 is increased linearly with moving downward so as to ensure the firm support.

When the amplitude of the input vibration becomes larger, the pressing portion 37 moves from the inclined portion 57 to the downward R-shaped portion 58. Since the R-shaped portion 58 has a sliding surface of a round curved surface, the spring constant of the elastic diaphragm portion 31 increases nonlinearly relative to an amount of the downward displacement. As a result, the spring constant of the elastic diaphragm portion 31 becomes larger enough and the hydraulic liquid within the primary liquid chamber 12 is fed in large amounts into the damping orifice passage 14 whereby the resonance efficiency can be raised to realize the high damping.

Further, when the amplitude of the input vibration grows so much to the excessive amplitude and the pressing portion 37 moves close to the lower end of the round-shaped portion 58, the input vibration is not the one in the normal condition but is the larger amplitude vibration in the abnormal condition, that is, the vibration of the excessive amplitude, so that it is necessary to stop the downward movement of the stopper leg portion 35.

Accordingly, when the stopper leg portion 35 moves from the position shown in FIG. 7 onto the stopper wall 59, the upper surface of the stopper wall 59 and the lower surface 37c of the pressing portion 37 each of which is comprised of a substantially horizontal flat surface ensure that the downward movement of the stopper leg portion 35 is surely stopped by allowing the lower surface 37c to contact the upper surface of the stopper wall 59, whereby the excessive downward elastic deformation of the elastic diaphragm portion 31 can be prevented.

FIG. 8 shows the condition in which the vibration is reversed after the vibration of the excessive amplitude is inputted and the primary liquid chamber 12 changes from the positive pressure to the negative pressure. The elastic diaphragm portion 31 is elastically deformed upwardly to the primary liquid chamber 12 in response to a restoring expansion of the primary liquid chamber 12. This is the condition that the cavitation phenomenon occurs.

However, the elastic diaphragm portion 31 is elastically deformed in such a way as to allow the central portion side to project uppermost and the pressing portion 37 is tilted in such a way as to turn the forward end downward. Since the support wall 44 is increased in diameter as it approaches the primary liquid chamber 12, the seal rib 37b separates from the inclined portion 57 so that the circumferential gap is apt to be created between the inclined portion 57 of the support wall 44 and the stopper leg portion 35.

The position in which the gap is created is the open position of the stopper leg portion 35. By the way, the position of the stopper leg portion 35 before the circumferential gap is created, that is, to the extent of reaching the vibration of the large amplitude is the closed position as opposed to the open position. The stopper leg portion 35 turns to the open position only when the excessive amplitude vibration is inputted.

This circumferential gap allows the third liquid chamber 61 to communicate with the secondary liquid chamber 13, whereby the hydraulic liquid of the secondary liquid chamber 13 passes from the third liquid chamber 61 through the relief passage 60 to the damping orifice passage 14 and then flows into the primary liquid chamber 12. Therefore, the hydraulic liquid is rapidly supplied to the primary liquid chamber 12 to cancel the increase in the negative pressure thereby enabling the occurrence of the cavitation phenomenon to be restrained.

Moreover, the primary liquid chamber 12 becomes the negative pressure by the reaction at the time of the excessive amplitude, and the elastic diaphragm portion 31 is elastically deformed on a large scale toward the primary liquid chamber 12. Then, the seal surface 37a of the pressing portion 37 moves upward above the lower end of the taper shaped concave 55 so that the relief passage 60 and the secondary liquid chamber 13 are allowed to surely communicate with each other through the taper shaped concave 55. Therefore, a larger amount of the hydraulic liquid can be supplied into the relief passage 60, and the communication between the third liquid chamber 61 and the secondary liquid chamber 13, that is, the opening and closing operation by the stopper leg portion 35 as an opening and closing valve can be performed.

In addition, since the bottom portion of the taper shaped concave 55 has the taper surface, the hydraulic liquid can flows smoothly through the taper shaped concave 55.

Further, since the one end of the relief passage 60 is located in the vicinity of the primary liquid chamber side opening 24 of the damping orifice passage 14, the relief passage 60 allows the hydraulic liquid to flow from the side of the third liquid chamber 61 almost without being restricted by the damping orifice passage 14 so that it is possible to obtain such a large amount of relief liquid as is capable of contributing to the restraint of the cavitation phenomenon.

Furthermore, the third liquid chamber 61 is provided by forming the stopper leg portion 35 on the elastic partition member 30. Therefore, by allowing the relief passage 60 to communicate with the third liquid chamber 61 and by opening and closing between the support wall 44 and the stopper leg portion 35, the relief passage 60 and the secondary liquid chamber 13 can be connected and disconnected through the relief passage 60. Moreover, in comparison with the case where the relief passage 60 is connected directly to the secondary liquid chamber 13, a degree of freedom with respect to the opening position of the relief passage 60 is increased. Since the opening and closing operation between the support wall 44 and the stopper leg portion 35 is capable of being performed by the full circumference of the stopper leg portion 35, a sufficient opening area can be obtained without much extending the gap at the time of the opening so that the opening and closing operation can be performed easily and assuredly while increasing the degree of freedom with respect to the opening and closing structure.

By the way, the present invention is not limited to the above embodiment but may be variously modified and applied within the principle of the invention.

For example, the passage to be opened and closed by the stopper leg portion 35 is not necessarily the relief passage 60, and an opening and closing type hydraulic liquid passage (hereinafter, referred to as a second passage) to be used for other orifice passage which has a resonance frequency different from the damping orifice passage 14 may be utilized. This second passage is to be provided in the partition member 11 so as to communicate between the primary liquid chamber 12 and the secondary liquid chamber 13, irrespective of use or shape. However, the opening on the side of the secondary liquid chamber 13 is located on such a position as to allow the second passage to be switched to the opening position that the second passage communicates with the secondary liquid chamber 13 and to the closed position that the communication with the secondary liquid chamber 13 is cut off, when the stopper leg portion 35 moves on the support wall 44 in accordance with the elastic deformation of the elastic diaphragm portion 31.

With this structure, the second passage can be easily opened and closed by the use of the existing elastic diaphragm portion 31 and stopper leg portion 35, thereby simplifying the formation of the opening and closing structure functioning as the opening and closing valve.

Further, the opening and closing operation between the support wall 44 and the stopper leg portion 35 may be performed by not the full circumference but any optional portion in the circumferential direction of the stopper leg portion 35, whereby it is possible to raise the degree of freedom with respect to the opening and closing structure of the third liquid chamber 61 relative to the secondary liquid chamber 13.

Figure 9:
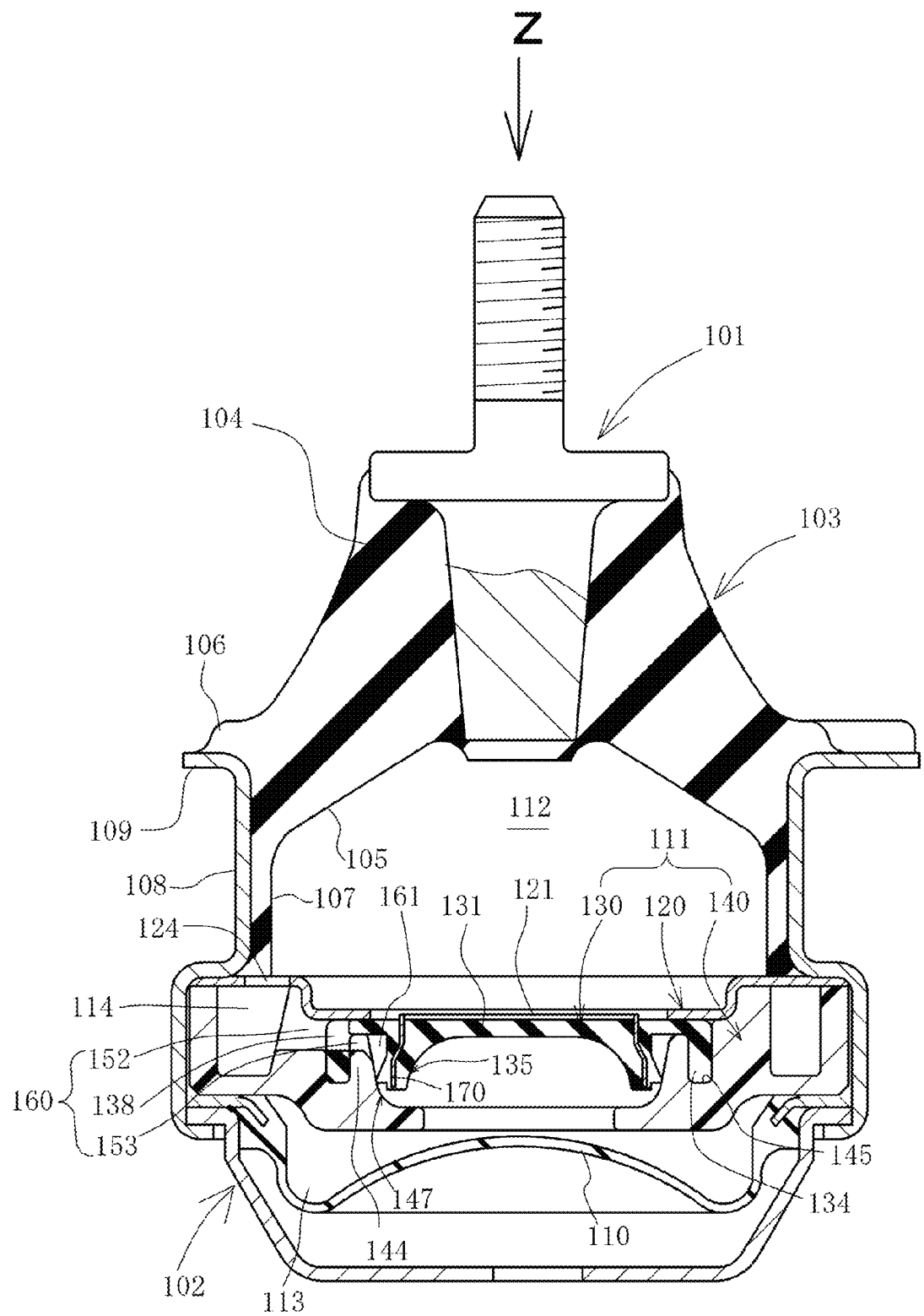
FIG. 9 is a cross sectional view of an engine mount according to a second embodiment of the present invention.
Figure 10:
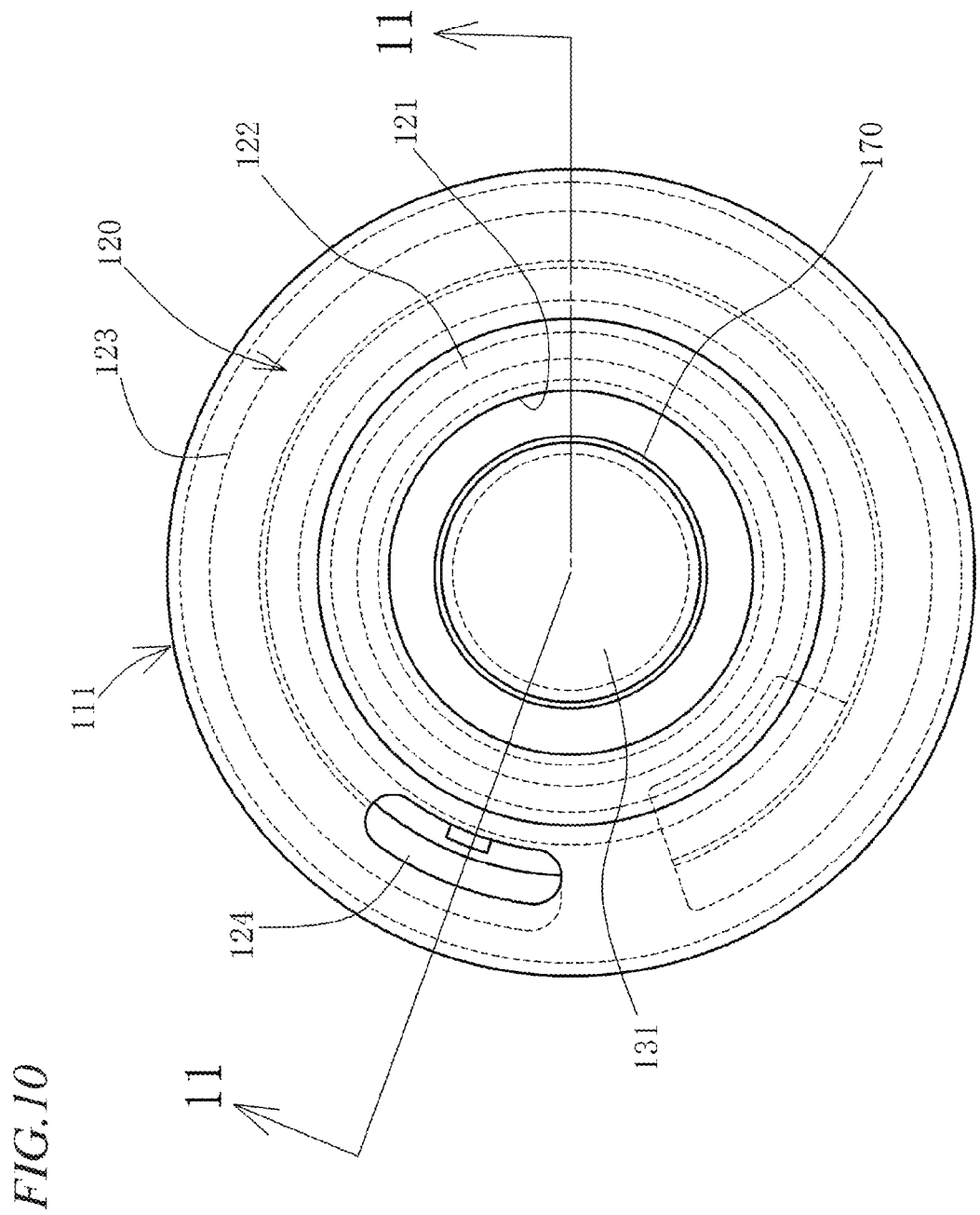
FIG. 10 is a plan view of a partition member.
Figure 11:
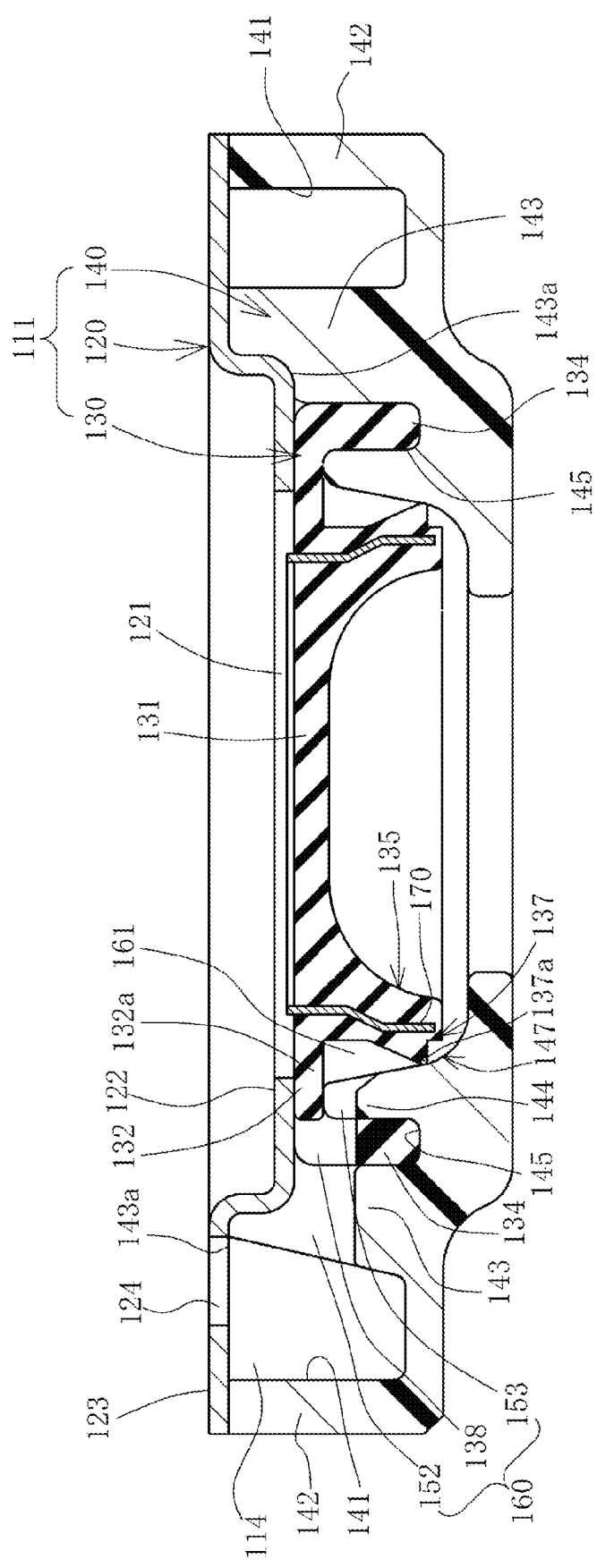
FIG. 11 is a cross sectional view taken along line 11-11 of FIG. 10.
Figure 12:
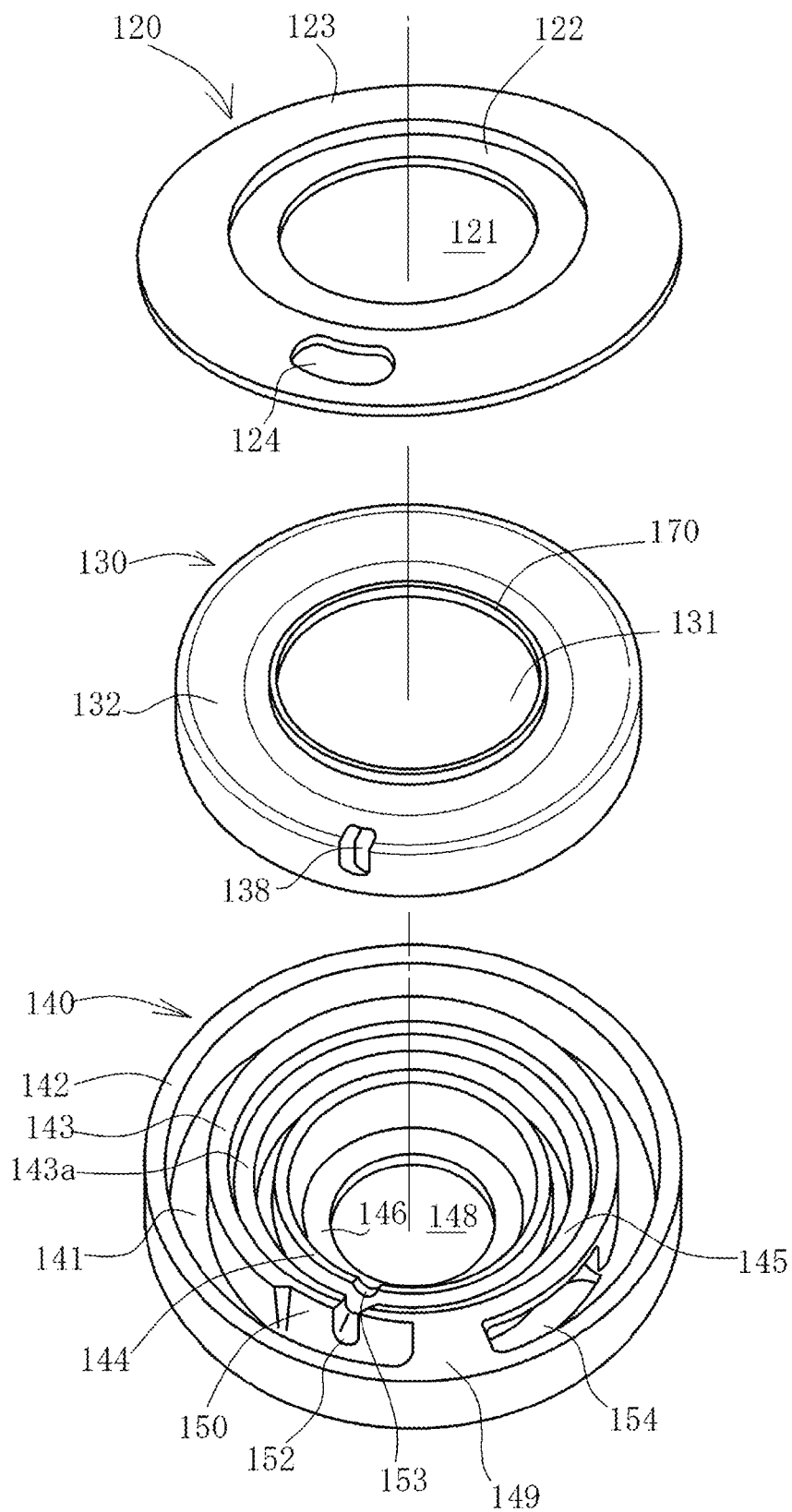
FIG. 12 is an exploded perspective view of the partition member, showing each of component elements in a perspective view.
Figure 13:
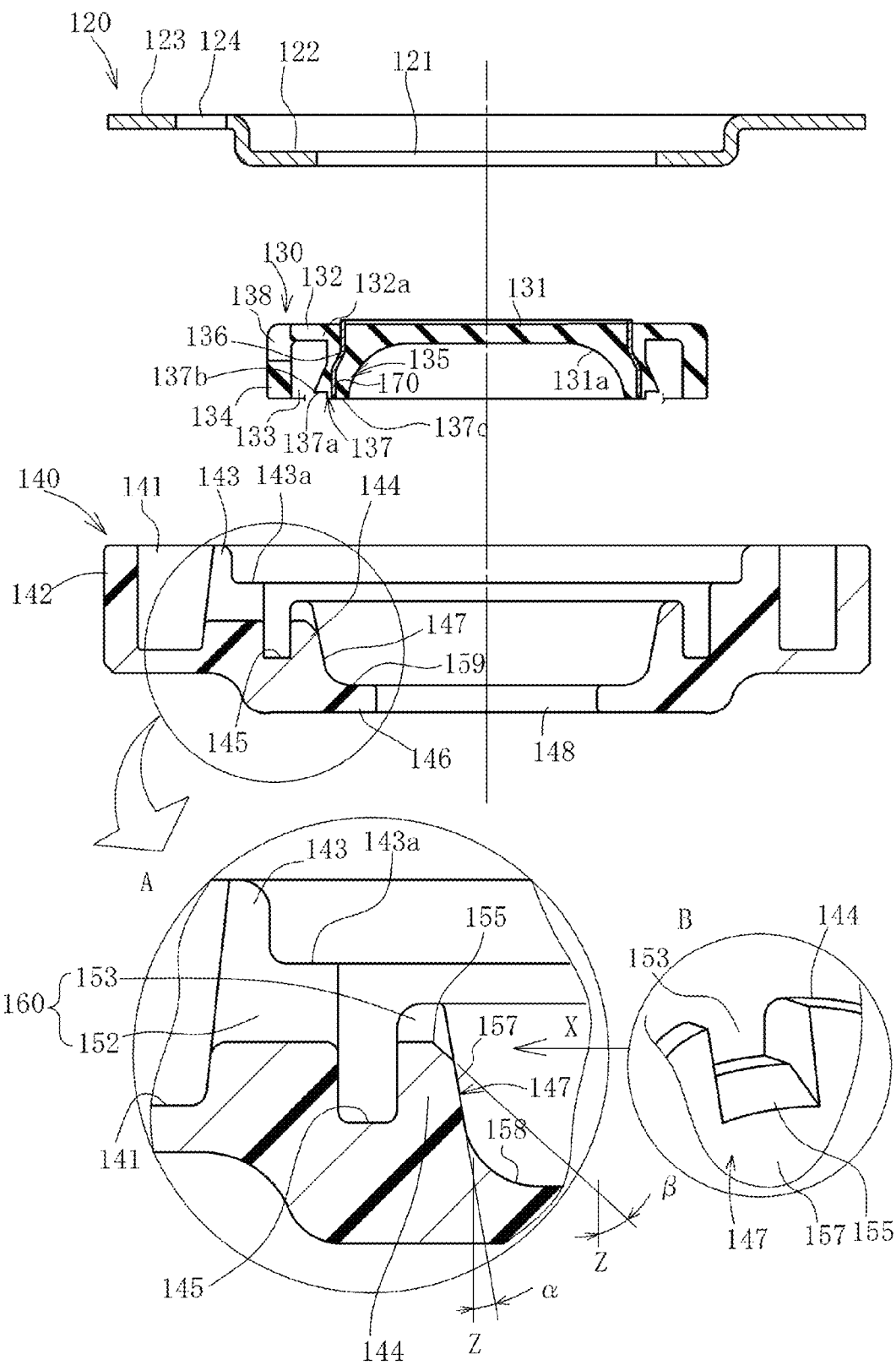
FIG. 13 is an exploded cross sectional view of the partition member showing each of component elements in a cross section.
Figure 14:
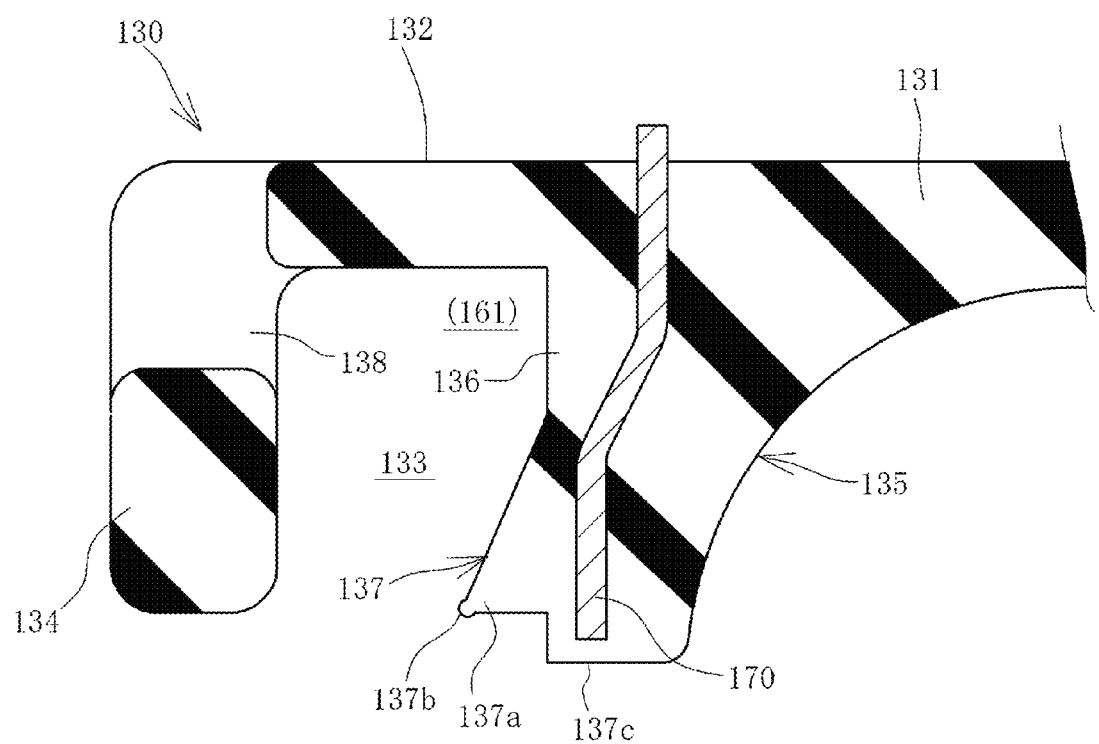
FIG. 14 is a partially enlarged cross sectional view of an elastic partition member.
Figure 15:
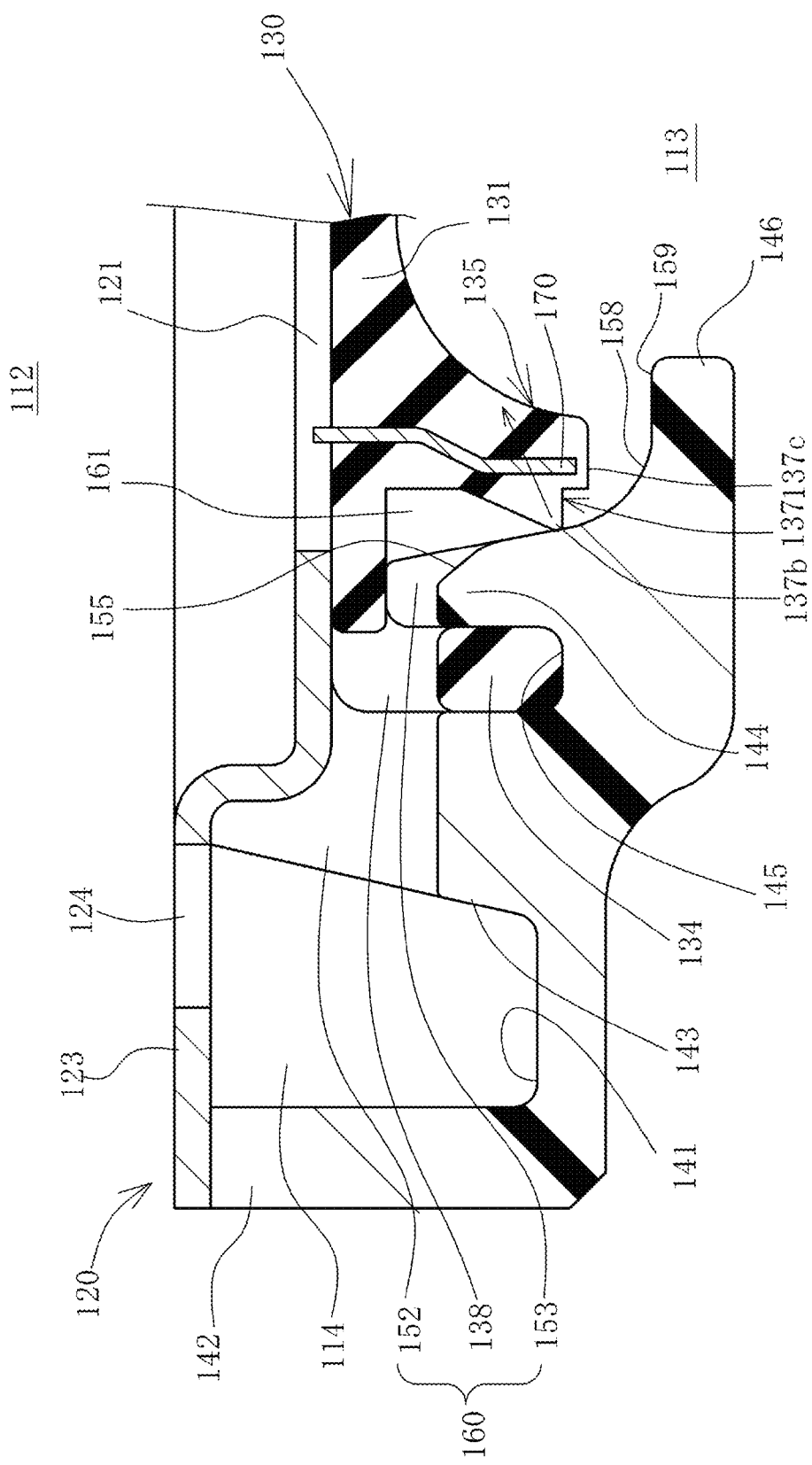
FIG. 15 is an explanatory view of the operation in a normal condition.
Figure 16:
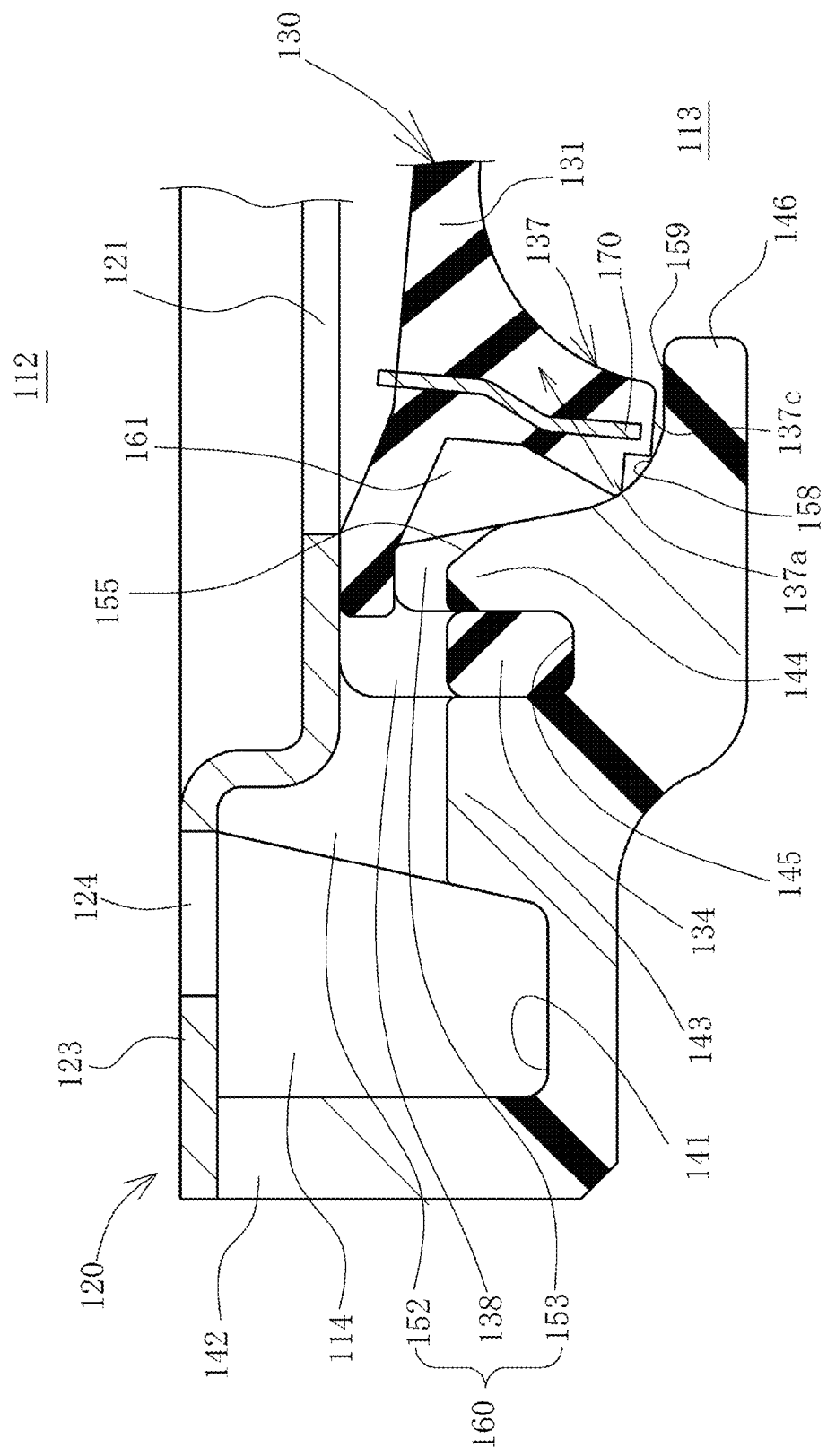
FIG. 16 is an explanatory view of the operation when a comparatively large load is applied in a normal condition.
Figure 17:
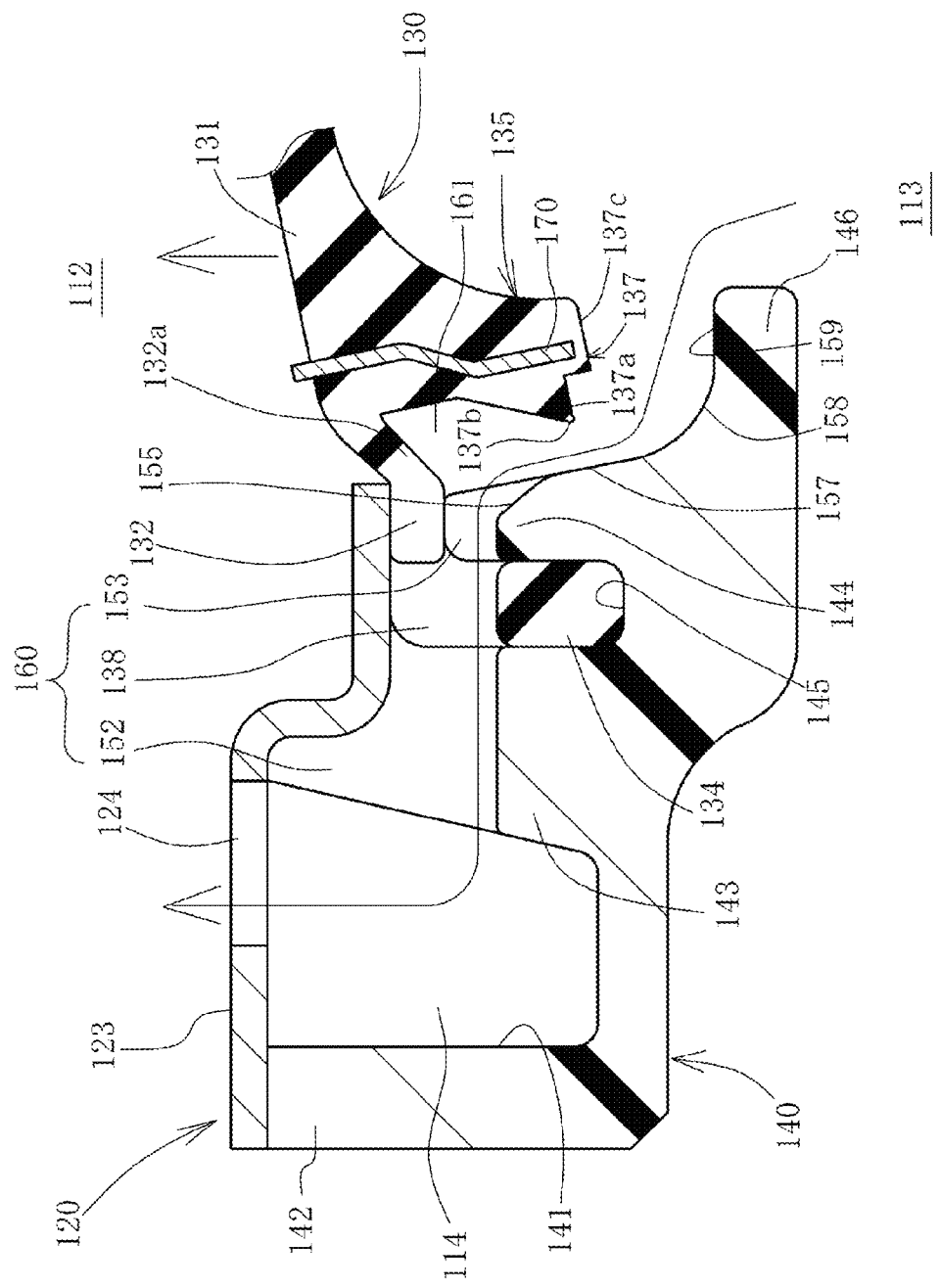
FIG. 17 is an explanatory view of the operation when a minus vibration of excessive amplitude is applied.

Next, the second embodiment configured as an engine mount for a motor vehicle like the first embodiment will be described. FIG. 9 is a cross sectional view taken along a central axis (parallel to the direction of an arrow Z) of the engine mount. FIG. 10 is a plan view of a partition member. FIG. 11 is a cross sectional view taken along line 11-11 of FIG. 10. FIG. 12 is an exploded perspective view of the partition member. FIG. 13 is an exploded cross sectional view of the partition member. FIG. 14 is a partially enlarged cross sectional view of an elastic partition member showing a stopper leg portion. FIGS. 15 through 17 are explanatory views of the operation. In this embodiment a partial modification is added to the stopper leg portion in the first embodiment and other components are substantially the same with the first embodiment. Therefore, in the following description, like components corresponding to the first embodiment are given like reference characters adding 100 to the reference characters in the first embodiment.

In FIG. 9, the engine mount comprises a first mounting member 101 mounted on the engine side, a second mounting member 102 mounted on the vehicle body side, and an elastic main body 103 configured to connect the first and second mounting members and to be integrally combined therewith. The elastic main body 103 is a member in the shape of a substantially circular cone formed of a publicly known elastic material such as rubber or the like. On the top of this circular cone portion 104 the first mounting member 1 is integrally implanted.

An inside surface 105 of the circular cone portion 104 forms an internal wall facing a liquid chamber as described later. The circumference of a hem portion of the circular cone portion 104 is formed with a flange 106. A lower portion below the flange 106 extends further downwardly to form a lining portion 107. The flange 106 is integrally combined with a flange 109 of a cylindrical side wall portion 108 which forms a part of the second mounting member 102. The lining portion 107 covers an internal wall of the side wall portion 108.

The inside of the elastic main body 103 defines a downwardly open space and this open space is closed with diaphragm 110 so as to form a liquid chamber inside thereof. This liquid chamber is divided by a partition member 111 into a primary liquid chamber 112 on the side of the elastic main body 103 and a secondary liquid chamber 113 on the side of the diaphragm 110. These liquid chambers are connected to each other by a damping orifice passage 114 for absorbing low frequency vibrations, which is formed in an outer circumferential portion of the partition member 111. An input direction Z of a principal vibration to be inputted to this engine mount extends from the first mounting member 101 to the primary liquid chamber 112 in parallel to an axis of the first mounting member and is orthogonal to a surface of the partition member 111 facing the primary liquid chamber 112.

The partition member 111 is formed with three components comprising a cover member 120, an elastic partition member 130 of a proper elastic material such as rubber or the like, and a substantially cup shaped frame member 140 for supporting the elastic partition member 130. The cover member 120 functions as a lid to be put on the elastic partition member 130. A central opening 121 is formed in a central region of the cover member 120. Around the central opening 121 there is formed a step portion 122 which is lowered one step below an outer circumferential side. On an outer circumferential portion 123 located on the outer circumferential side of the step portion 122 there is provided an opening 124 of the damping orifice passage 114 on the side of the primary liquid chamber 112.

The elastic partition member 130 comprises a central portion forming a thin elastic diaphragm portion 131, an outer circumferential portion 132 being located on the circumferential side of the central portion and forming a ring shaped groove 133 which is opened downwardly by being carved from the bottom side thereof, a circumferential wall 134 being located on the outer circumferential side across the ring shaped groove 133, and a stopper leg portion 135 of a substantially L-shaped cross section being located on the inner circumferential side of the ring shaped groove 133. As shown in FIG. 10, the elastic partition member 130 has a circular shape in a plan view (viewed in the direction of the arrow Z of FIG. 9), and the stopper leg portion 135 also has a circular shape. Moreover, the ring shaped groove 133 is formed with an outwardly (the direction toward the circumferential wall 134) open annular groove. The circumferential wall 134 is formed with an annular wall.

The elastic diaphragm portion 131 faces the primary liquid chamber 112 through the central opening 121 of the cover member 120 and forms a portion which is capable of being elastically deformed enough to absorb the change of internal pressure of the primary liquid chamber 112 in proportion to the elastic deformation of the elastic main body 103. The lower wall of the elastic diaphragm portion 131 is formed with a concave curved surface 131a which is curved upward, while the upper wall thereof is formed with a substantially flat surface. Therefore, the elastic diaphragm portion 131 is thinnest at the center thereof and is gradually thickened toward the outer circumferential side to be connected with the stopper leg portion 135.

As shown in FIG. 14, the stopper leg portion 135 is integrally formed continuously with the outer circumference of the elastic diaphragm portion 131 on the bottom side of the elastic partition member 130 and has a substantially L-shaped cross section comprised of a neck portion 136 which is connected with the outer circumferential portion 132 and of a pressing portion 137 which projects outward from the neck portion 136 in the radial direction. An outer circumferential surface of the pressing portion 137 is formed in an annular shape in a plan view. A rigid ring 170 is integrally molded and implanted in the pressing portion 135.

The rigid ring 170 is a ring shaped member made of proper rigid materials such as metal or the like which has a remarkably higher rigidity in comparison with the relatively soft elastic member such as rubber or the like forming the stopper leg portion 135. The degree of the rigidity is such a level that visually observable elastic deformation does not occur at the time of displacement of the elastic diaphragm portion 131 although such elastic deformation occurs in the stopper leg portion 135. The central axis of the rigid ring 170 extends parallel to the central axis (corresponding to the direction of the arrow Z of FIG. 9) of the elastic partition member 130 and has a vertical width extending in the direction of the central axis.

As most apparent from FIG. 15, the rigid ring 170 is curved at the intermediate portion of the vertical direction in cross section. An upper portion of the rigid ring 170 is comprised of a small diameter portion located inside the upper portion of the ring shaped groove 133 and the upper end of the rigid ring 170 projects upward at the outer circumferential region of the elastic diaphragm portion 131. A lower portion of the rigid ring 170 is comprised of a large diameter portion and integrally implanted in the thick wall region of the stopper leg portion 135 so as to reinforce the rigidity of the stopper leg portion 135 and the lower end portion.

An outer circumferential wall of the pressing portion 137 forms an inclined taper surface which projects outward in the radial direction with nearing downward, and a lower wall of the pressing portion 137 forms a step in high and low positions. This step is formed with a higher step portion on the outer circumferential side to form a compressed portion 137a of a substantially triangular cross section in cooperation with the taper surface. An outwardly projecting seal rib 137b is formed on the forward end of a corner of the higher step portion. A lower step portion of the lower wall forms a stopper surface 137c of a substantially horizontal flat surface. The compressed portion 137a is arranged on the outer circumferential side with respect to the rigid ring 170. The lower end of the rigid ring 170 extends to the inside of the lower step portion forming the stopper surface 137c.

The outer circumference of the compressed portion 137a of the pressing portion 137 comes in surface contact with and slides on a support wall 144 to be given later thereby allowing the spring of the stopper leg portion 135 to be heightened. The seal rib 137b is an annular rib projecting around the circumference of the pressing portion 137 and is configured to provide sealing between the pressing portion 137 and the support wall 144 by being pressed on and compressed by the support wall 144. The degree of the seal is adjustable by adjusting an interference of the seal rib 37b in the same way as the first embodiment.

The ring shaped groove 133 is an annular space of a substantially inverted L-shape in cross section an upper portion of which extends radially inward above the pressing portion 137 to form an extension which the neck portion 136 faces. The ring shaped groove 133 is surrounded with the outer circumferential portion 132, the circumferential wall 134 and the stopper leg portion 135 and communicates through a communication orifice 138 with an outer space external to the circumferential wall 134 and the outer circumferential portion 132. The communication orifice 138 is formed by cutting out a part of a shoulder portion comprised of a joining portion between the upper end of the circumferential wall 134 and the outer circumferential portion 132.

A frame member 140 is formed of a metal such as a light alloy, etc. or a proper rigid material such as resin, etc. In the outer circumferential region of the frame member 140 an upward open annular groove 141 is formed between an outer circumferential wall 142 and an inner circumferential wall 143 opposed thereto so as to constitute the orifice passage 114 in cooperation with the cover member 120. The support wall 144 of an annular circumferential wall is formed on the inside of the inner circumferential wall 143 with a space left from the latter. An upward open support groove 145 is annularly formed between the support wall 144 and the inner circumferential wall 143. An upper end of the support wall 144 is positioned lower than a step 143a which is formed on the inner circumferential side of an upper end region of the inner circumferential wall 143. A bottom portion 146 on the inside of the support wall 144 is formed one step lower than a bottom of the outer circumferential side of the support wall 144. An inner circumferential wall of the support wall 144 is formed with a pressed surface 147 which extends below a bottom of the support groove 145. A central opening 148 is provided in a central region of the bottom portion 146.

As shown in FIG. 12, the annular groove 141 is not formed on a full circumference, and both ends in the circumferential direction are separated by a connecting portion 149 which partially connects the outer circumferential wall 142 and the inner circumferential wall 143. On the side of one end of the annular groove 141, there is formed a thin-walled portion 150 which is partially depressed inward by shaving the outer circumferential side of the inner circumferential wall 143. An outer communication groove 152 is provided by partially cutting out an upper end wall of the thin-walled portion 150. Moreover, an inner communication groove 153 of a cutout shape is also provided in an upper end region of the support wall 144 in such a way as to correspond to the outer communication groove 152 in the radial direction. Thus, the annular groove 141 and the central opening 148 are allowed to communicate with each other through the outer communication groove 152 and the inner communication groove 153.

The other end of the annular groove 141 communicates with an opening 154 on the secondary liquid chamber side formed on the bottom of the annular groove 141.

As shown in an enlarged illustration A of FIG. 13 and an enlarged illustration B thereof viewed in the direction of arrow X of the enlarged illustration A, a bottom of the outer communication groove 152 has the same height with a bottom of the inner communication groove 153. A taper shaped concave 155 communicating with a bottom of the inner communication groove 153 is provided on the inner circumferential surface of the support wall 144. This taper shaped concave 155 is formed in such a way as to be carved from the side of the pressed surface 147 forming the inner circumferential surface of the support wall 144 to the outer circumferential side. An upper end of the taper shaped concave 155 is connected with the bottom of the inner communication groove 153 while a lower end of the taper shaped concave 155 is flush with an upper portion of the inner circumferential surface of the support wall 144. Further, a bottom of the taper shaped concave 155 is formed with a taper surface which inclines downwardly in the direction of the pressed surface 147.

The upper portion of the pressed surface 147 inclines more steeply than the taper surface of the taper shaped concave 155 and is formed with an inclined portion 157 comprised of an inclined surface extending downwardly in the central direction on the lower side thereof, while the lower portion of the pressed surface 147 is formed with an round-shaped portion 158 comprised of a round curved surface. The inclined portion 157 extends to the central side of the elastic diaphragm portion 131 as it nears the lower end and is formed with the inclined surface of an angle α relative to the principal vibration input direction Z. When an angle of the taper surface of the taper shaped concave 155 relative to the principal vibration input direction Z is β, there is expressed α<β.

Namely, the inclined portion 157 inclines in such a way as to converge at the center as it goes downward in FIG. 9. In other words, the support wall 144 is formed in a cylindrical shape, and the inclined portion 157 is formed in such a condition that although the inner circumferential surface of the support wall 144 has a certain degree of vertical width allowing the stopper leg portion 35 to slide in parallel to the principal vibration input direction Z, an internal diameter of a circular space formed by the support wall 144 decreases with going downward in the drawing. However, each of sizes of the angle α and angle β can be freely selected in accordance with the purpose while maintaining the relation of α<β.

A lower portion below the pressed surface 147 is formed with a stopper wall 159 extending continuously from the round-shaped portion 158. An upper surface of the stopper wall 159 is a substantially horizontal flat surface parallel to the lower surface 137c of the pressing portion 137 and extends in the central direction so as to form an upper surface of the bottom portion 146 around the central opening 148. The pressed surface 147 comprises the inclined portion 157, the round-shaped portion 158 and the stopper wall 159. The pressed surface 147 is configured to receive the pressing stopper leg portion 135 and to compress the stopper leg portion 135 by press reaction force from the pressed surface 147 while changing the amount of compression. As a consequence, when the compression amount is increased, the spring of the elastic diaphragm portion 131 is heightened thereby to restrain the free elastic deformation thereof, so that the pressed surface 147 forms a deformation restraining portion of the elastic diaphragm portion 131.

By the way, this deformation restraining portion fractionalizes the function in accordance with an amount of displacement of the stopper leg portion 135, that is, the amplitude of the input vibration. The pressing portion 137 slides on the inclined portion 157 at the time of small amplitude and slides on the round-shaped portion 158 at the time of large amplitude. Further, at the time of excessive amplitude, it comes in contact with the stopper wall 159 on the side of a plus (+) vibration and moves onto or above the taper shaped concave 55 on the side of minus (−) vibration.

As shown in FIGS. 12 and 13, when the elastic partition member 130 is put on the frame member 140 so as to allow the circumferential wall 134 of the elastic partition member 130 to be engaged with the support groove 145 and then the cover 120 is put on the elastic partition member 130, these three components are combined and assembled into the partition member 111 as shown in FIGS. 10 and 11.

In this assembled state, as shown in FIG. 11, the circumferential wall 134 of the elastic partition member 130 is fitted into the support groove 145 and fixed by allowing the upper end of the circumferential wall 134 to be held in pace with the step portion 122 of the cover member 120. Also, the stopper leg portion 135 is fitted on the inner circumferential side of the support wall 144, whereby the pressing portion 137 is pressed against the pressed surface 147.

The annular groove 141 is closed on the upper side thereof with the outer circumferential portion 123 of the cover member 120 thereby to form the damping orifice passage 114. This damping orifice passage 114 communicates through the opening 124 with the primary liquid chamber 112 and also communicates through the opening 154 (see FIG. 4) with the secondary liquid chamber 113. Moreover, the outer communication groove 152 and the inner communication groove 153 are connected continuously through the communication orifice 138 provided on the shoulder portion of the circumferential wall 134 of the elastic partition member 130, so as to form the relief passage 160, thereby establishing the communication between the damping orifice passage 114 and a third liquid chamber 161 formed by the ring shaped groove 133.

Further, in the inside region of the shoulder portion of the circumferential wall 134 of the elastic partition member 130, the outer circumferential portion 132 is held between the step portion 122 of the cover member 120 and the upper end portion of the support wall 144. The step portion 122 is positioned on the step portion 143a of the inner circumferential wall 143. An inner circumferential edge of the step portion 122 facing the central opening 121 and the upper end portion of the support wall 144 are located substantially on the same position, and a portion of the outer circumferential portion 132 located on the inside of these components forms a thin unrestricted portion 132a. This unrestricted portion 132a is elastically deformed easily so that the elastic diaphragm portion 131 located on the inner circumferential side is capable of being elastically deformed.

The stopper leg portion 135 and the elastic diaphragm portion 131 are positioned inside the central opening 121. The elastic diaphragm portion 131 faces the primary liquid chamber 112 directly and the internal pressure of the primary liquid chamber 112 is directly transmitted to the elastic diaphragm portion 131 so that the elastic diaphragm portion 131 is elastically deformed to absorb a rise in the hydraulic pressure of the primary liquid chamber 112. The lower surface of the elastic diaphragm portion 131 faces the secondary liquid chamber 113 through the central opening 148 as well. The stopper leg portion 135 is positioned above the stopper wall 159 so as to overlap with each other in the vertical direction.

The third liquid chamber 161 is designated as the third liquid chamber when the primary liquid chamber 112 and the secondary liquid chamber 113 are designated as the first and second liquid chambers, respectively. The third liquid chamber 161 is an annular liquid chamber which is surrounded by the inner circumferential surface of the support wall 144 engaged with the ring shaped groove 133, the outer circumferential portion 132 of the elastic partition member 130 and the stopper leg portion 135 so as to be formed continuously on the full circumference of the elastic partition member 130 in the circumferential direction thereof. The third liquid chamber 161 communicates with the primary liquid chamber 112 through the relief passage 160 and the damping orifice passage 114, while it does not communicate with the secondary liquid chamber 113 in the normal condition since the stopper leg portion 135 is pressed against the pressed surface 147 so as to close and cut off the communication.

The illustrated condition in FIGS. 11 and 15 is an unloaded condition in which a load from the primary liquid chamber 112 is not applied to the elastic partition member 130. In this condition, the pressing portion 137 of the stopper leg portion 135 is pressed on and comes in close contact with the pressed surface 147, and the seal rib 137b seals the secondary liquid chamber 113, whereby a closed condition between the pressing portion 137 and the pressed surface 147 is ensured. Then, in the normal condition, that is, in the case where the input vibration is the one of the small amplitude or the large amplitude within such an input range of the predetermined size that there is no special requirement for restraining the cavitation phenomenon, the pressing portion 137 is configured to be positioned below the lower end of the taper shaped concave 155.

Therefore, the up and down vibration of the elastic diaphragm portion 131 in the normal condition allows the pressing portion 137 to slide up and down merely on the lower portion of the pressed surface 147 located below the lower end of the taper shaped concave 155 while maintaining the sealed condition. Then, since the pressed surface 147 extends inward as the pressing portion 137 moves downward, the pressing portion 137 is pressed firmly in the central direction of the elastic diaphragm portion 131 to heighten the spring, so that the spring of the elastic diaphragm portion 131 can be increased nonlinearly thereby to heighten the damping when the large amplitude vibration is inputted.

Next, the operation of the second embodiment will be described. When the vibration is inputted and the internal pressure of the primary liquid chamber 112 is fluctuated by the elastic deformation of the elastic main body 103, the elastic diaphragm portion 131 is elastically deformed to absorb the fluctuation of the internal pressure. Then, as shown in FIG. 15, the stopper leg portion 135 is deformed together with the elastic diaphragm portion 131, and the forward end of the pressing portion 37 is pressed on the inclined portion 157 in the direction substantially orthogonal to the inclined surface, so that the seal rib 137b is compressed so as to closely contact the inclined portion 157.

In this condition, at the time of the normal condition in which the amplitude of the input vibration is comparatively small, the pressing portion 137 slides up and down on the inclined portion 157 in the position below the lower end of the taper shaped concave 155, and the elastic diaphragm portion 131 is elastically deformed to absorb the hydraulic pressure fluctuation so as to improve the riding quality.

At that time, when the elastic diaphragm portion 131 is displaced downwardly, the compressed portion 137a is compressed between the rigid ring 170 and the inclined portion 157 to increase the spring of the elastic diaphragm portion 131 thereby restraining the deformation of the elastic diaphragm portion 131. The spring constant of the elastic diaphragm portion 131 increases linearly as the elastic diaphragm portion 131 moves downward. Therefore, a large amount of the hydraulic liquid within the primary liquid chamber 112 is capable of being fed into the damping orifice passage 114 to raise the resonance efficiency, thereby making it possible to realize the high damping.

As shown in FIG. 16, when the amplitude of the input vibration becomes larger, the pressing portion 137 moves from the inclined portion 157 to the downward R-shaped portion 158. Since the R-shaped portion 158 has a sliding surface of a round curved surface, the compressed portion 137a is further compressed and the spring constant of the elastic diaphragm portion 131 increases nonlinearly relative to an amount of the downward displacement. As a result, the spring constant of the elastic diaphragm portion 131 becomes larger enough and the hydraulic liquid within the primary liquid chamber 112 is fed in larger amounts into the damping orifice passage 114 whereby the resonance efficiency can be raised to realize the high damping.

Like this, since the rigid ring 170 which has a circular band shape of higher rigidity than the elastic material forming the stopper leg portion 135 is integrally combined with the stopper leg portion 135, the outer circumferential side relative to the rigid ring 170 is allowed to function as the compressed portion 137a, whereby this compressed portion 137a can be compressed in proportion to the displacement of the elastic diaphragm portion 131. Since the rigid ring 170 is a component of high rigidity, it is not elastically deformed as large as it can be visually inspected. As a result, the pressing portion 137 of the stopper leg portion 135 is partitioned and only the side of the compressed portion 137a is independently compressed.

Therefore, a small volume of compressed portion relative to the whole elastic member forming the pressing portion 137 is compressed thereby making it possible to raise the compressibility.

Accordingly, although the stopper leg portion 135 is formed integral with the elastic diaphragm portion 131 of which the elastic deformation needs to be facilitated to a certain degree, only a portion of the stopper leg portion 135 can be strengthened in spring so as to exert a strong deformation control on the displacement of the elastic diaphragm portion 131, so that it is possible to obtain such high damping as not to have ever been realized by the elastic diaphragm portion with the stopper leg portion.

Further, when the amplitude of the input vibration grows so much to the excessive amplitude and the pressing portion 137 moves close to the lower end of the round-shaped portion 158, the input vibration is not the one in the normal condition but is the abnormal larger amplitude vibration, that is, the vibration of the excessive amplitude, so that it is necessary to stop the downward movement of the stopper leg portion 135.

Accordingly, when the stopper leg portion 135 moves from the position shown in FIG. 16 onto the stopper wall 159, the upper surface of the stopper wall 159 and the lower surface 137c of the pressing portion 137 each of which is comprised of a substantially horizontal flat surface ensure that the downward movement of the stopper leg portion 135 is surely stopped by allowing the lower surface 137c to contact the upper surface of the stopper wall 159, whereby the excessive downward elastic deformation of the elastic diaphragm portion 131 can be prevented.

FIG. 17 shows the condition in which the vibration is reversed after the vibration of the excessive amplitude is inputted and the primary liquid chamber 112 changes from the positive pressure to the negative pressure. The elastic diaphragm portion 131 is elastically deformed upwardly to the primary liquid chamber 112 in response to a restoring expansion of the primary liquid chamber 112. This is the condition that the cavitation phenomenon occurs. However, the elastic diaphragm portion 131 is elastically deformed in such a way as to allow the central portion side to project uppermost and the pressing portion 137 is tilted in such a way as to turn the forward end downward so that the seal rib 137b separates from the inclined portion 157 thereby allowing the third liquid chamber 161 to communicate with the secondary liquid chamber 113. Therefore, since the hydraulic liquid of the secondary liquid chamber 113 passes from the third liquid chamber 161 through the relief passage 160 to the damping orifice passage 114 and then flows into the primary liquid chamber 112, the hydraulic liquid is rapidly supplied to the primary liquid chamber 112 to cancel the increase in the negative pressure thereby enabling the occurrence of the cavitation phenomenon to be restrained.

Moreover, the primary liquid chamber 112 becomes the negative pressure by the reaction at the time of the excessive amplitude, and the elastic diaphragm portion 131 is elastically deformed on a large scale toward the primary liquid chamber 112. Then, the seal rib 137a of the pressing portion 137 moves upward above the lower end of the taper shaped concave 155 so that the relief passage 160 and the secondary liquid chamber 113 are allowed to surely communicate with each other through the taper shaped concave 155. Therefore, a larger amount of the hydraulic liquid can be supplied into the relief passage 160, and the communication between the third liquid chamber 161 and the secondary liquid chamber 113, that is, the opening and closing operation by the stopper leg portion 135 as an opening and closing valve can be carried out quickly and steadily.

In addition, since the bottom portion of the taper shaped concave 155 has the taper surface, the hydraulic liquid can flow smoothly through the taper shaped concave 155.

Further, since the one end of the relief passage 160 is located in the vicinity of the primary liquid chamber side opening 124 of the damping orifice passage 114, the relief passage 160 allows the hydraulic liquid to flow from the side of the third liquid chamber 161 almost without being restricted by the damping orifice passage 160 so that it is possible to obtain such a large amount of relief liquid as is capable of contributing to the restraint of the cavitation phenomenon.

By the way, the opening and closing by the stopper leg portion between the third liquid chamber and the secondary liquid chamber according to the present invention is not necessarily performed by allowing the pressing portion provided on the lateral surface of the stopper leg portion to come in contact with and separate from the internal surface of the support wall. For example, it can be performed by allowing the lower surface of the stopper leg portion to come in contact with and separate from the support wall. This example is shown in FIGS. 18 through 20 as a third embodiment. In this embodiment a partial modification is added to the stopper leg portion in the first embodiment and other components are substantially the same with the first embodiment. Therefore, in the following description, like components corresponding to the first embodiment are given like reference characters adding 200 to the reference characters in the first embodiment. In addition, differences from the first embodiment will be mainly described in the following description and the same or corresponding structure with the first embodiment will be basically omitted from the description since the description in the first embodiment is correspondingly applied to this embodiment.

Figure 18A:
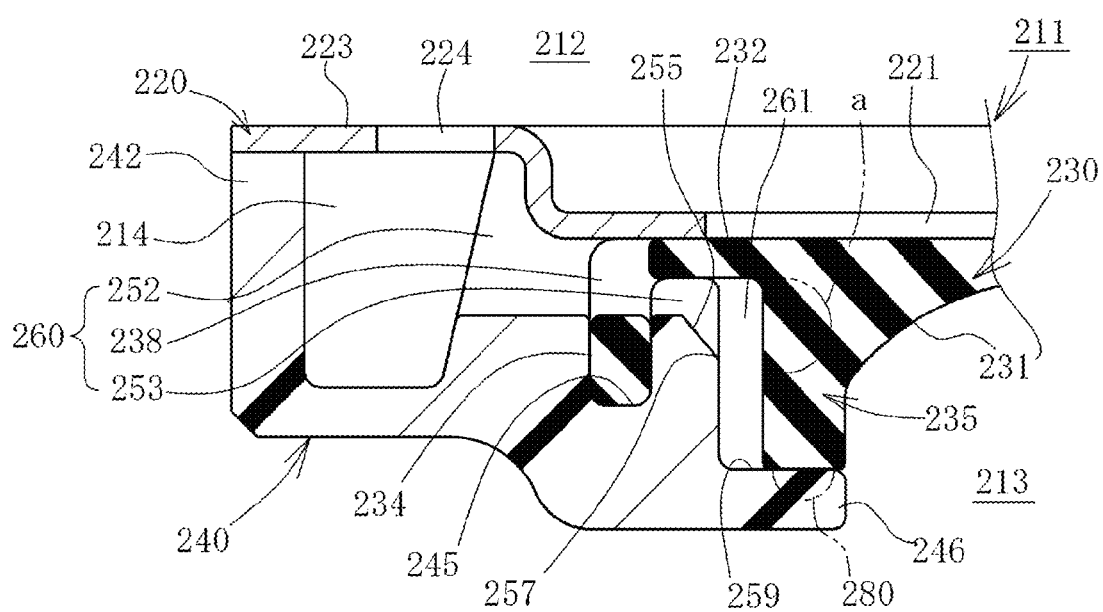
FIG. 18A is a cross sectional view showing the structure of a stopper leg portion according to a third embodiment of the present invention corresponding to FIG. 6.
Figure 18B:
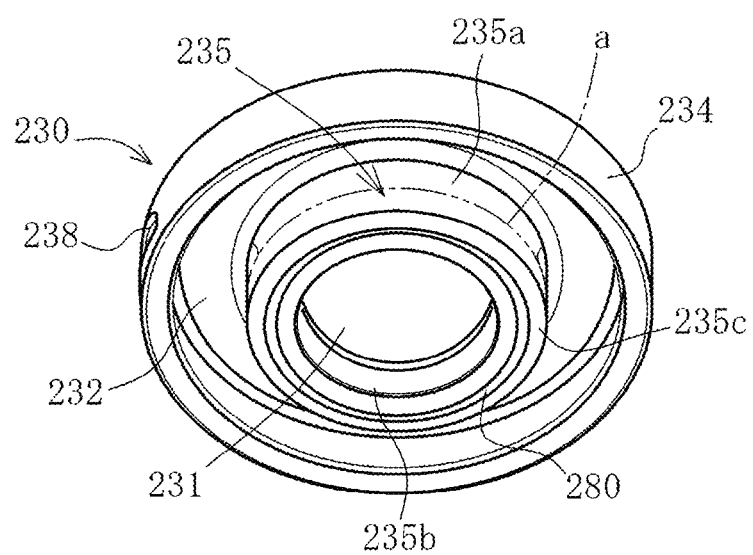
FIG. 18B is a perspective view showing an elastic partition member from below.
Figure 18C:
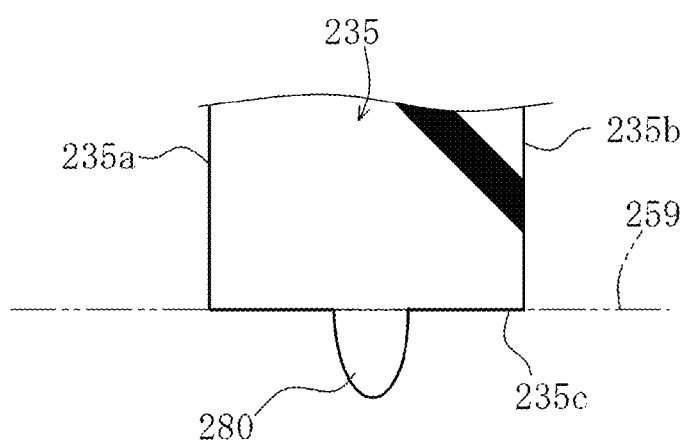
FIG. 18C is a cross sectional view showing the seal structure in a bottom wall of the stopper leg portion.

FIGS. 18A, 18B and 18C show the structure of a stopper leg portion 235 according to this embodiment, wherein FIG. 18A is a cross sectional view of a region corresponding to FIG. 6, FIG. 18B is a perspective view showing an elastic partition member from below, and FIG. 18C is a cross sectional view showing the seal structure in a bottom wall of the stopper leg portion 235.

In these drawings, the stopper leg portion 235 according to this embodiment is different from the substantially L-shaped cross section of each of the previous embodiments and is formed in a substantially cylindrical shape (see FIG. 18B). An outer circumferential surface 235a extends in parallel to the input direction Z of the principal vibration. Also, an inner circumferential surface 244a of a support wall 244 extends in parallel with the outer circumferential surface 235a of the stopper leg portion 235. A reference character 235b denotes an inner circumferential surface of the stopper leg portion 235 and a reference character 235c denotes a lower surface (pressing surface) of the stopper leg portion 235.

A bottom portion 246 of the support wall 244 extends in the central direction of an elastic partition member 230. An upper surface of the bottom portion 246 is formed as a stopper wall 259 with a flat surface orthogonal to the principal vibration input direction Z. A seal rib 280 projecting from the lower surface 235c of the stopper leg portion 235 is pressed fluid-tightly on the stopper wall 259.

There is formed a predetermined space between the outer circumferential surface 235a of the stopper leg portion 235 and the inner circumferential surface 244a. Therefore, a third liquid chamber 261 is not formed with an annular groove (shown by an imaginary line a in FIGS. 18A and 18B) extending in a central direction, on the outer circumferential surface 235a of the stopper leg portion 235 like each of the previous embodiments. The third liquid chamber 261 is formed by a space surrounded with the outer circumferential surface 235a of the stopper leg portion 235, the inner circumferential surface 244a of the support wall 244, an outer circumferential portion 232 of the elastic partition member 230 and the stopper wall 259. However, it is optional to form the annular groove as shown by the imaginary line a. Moreover, the support wall 244 may have an inclined structure like each of the previous embodiments. The seal rib 280 is configured to come in close contact with the stopper wall 259 so as to close space between the third liquid chamber 261 and the secondary liquid chamber 213 and to open the space only at the time of a minus vibration (−) of excessive amplitude.

The seal rib 280, as shown in FIG. 18B, is formed in a ring shape integral with the lower surface 235c of the stopper leg portion 235 so as to project downwardly from the lower surface 235c. The seal rib 280 has a semicircular shape in cross section as shown in FIG. 18C. However, this cross sectional shape is optional, and an acute angled triangle shape in cross section such as a wedge shape may be employed.

There will be also employable a cross sectional shape corresponding to a lower half of a crescent moon similar to a seal lip generally used for this kind of fluid seal.

FIGS. 18A and 18C show a neutral condition in which the vibration is not inputted and the elastic partition member 230 is not elastically deformed. The seal rib 280 in this condition is almost flattened as shown in FIG. 18C and elastically deformed to such an extent that the lower surface 235c of the stopper leg portion 235 contacts the stopper wall 259. However, the degree of the elastic deformation may be freely selected within the extent that the closing and sealing between the third liquid chamber 261 and the secondary liquid chamber 213 can be maintained when the vibration in the normal condition is inputted.

Like this, the seal rib 280 is integrally formed on the lower surface 235c of the stopper leg portion 235 which is opposed to the stopper wall 259, so as to project toward the stopper wall 259, thereby ensuring the sealing at the time of pressing the stopper leg portion 235 against the stopper wall 259.

The third liquid chamber 261 communicates with the primary liquid chamber 212 through a relief passage 260 formed in a frame member 240 and a circumferential wall 234 in the same way as each of the previous embodiments. By the way, the frame member 140 and the elastic partition member 230 are the same as the first embodiment except for the above differences, so that an elastic diaphragm portion 231, a communication orifice 238, an outer communication groove 252, an inner communication groove 253, an inclined portion 257, a damping orifice passage 214, etc. are also provided in a similar way.

Figure 19A:
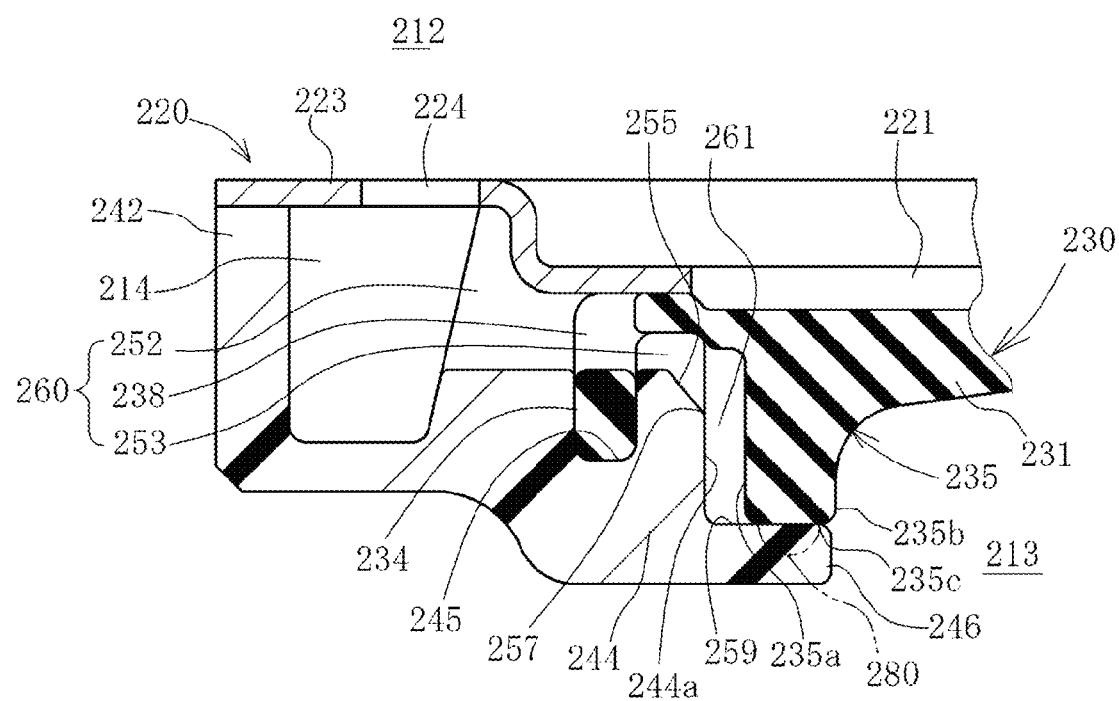
FIG. 19A is a view corresponding to FIG. 18A at the time of plus vibration.
Figure 19B:
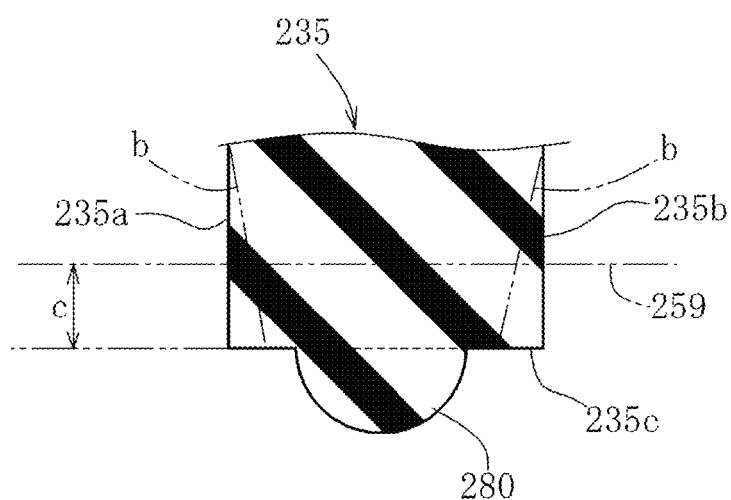
FIG. 19B is a view corresponding to FIG. 18C at the time of plus vibration.

Next, the operation will be described. When the vibration is inputted in the neutral condition shown in FIGS. 18A and 18C, the elastic partition member 230 is elastically deformed downwardly (toward the secondary liquid chamber 213) at the time of a plus (+) vibration, as shown in FIGS. 19A and 19B. In the drawing, FIGS. 19A and 19B correspond to FIGS. 18A and 18C, respectively (also the same with respect to FIG. 20). As shown in FIG. 19A, the elastic partition member 230 is elastically deformed downwardly and as shown in FIG. 19B the lower surface 235c of the stopper leg portion 235 is firmly pressed on the stopper wall 259 and is elastically deformed. This elastic deformation allows the stopper leg portion 235 to be compressed, thereby increasing the spring of the elastic partition ember 230.

By the way, as shown by an imaginary line c, when the outer circumferential surface 235a and the inner circumferential surface 235b of the stopper leg portion 235 or either of them are formed in a taper shape of a cross section tapering in the downward direction, the spring elasticity created by the stopper leg portion 235 can be changed nonlinearly. At the time of this plus (+) vibration, since the lower surface 235c of the stopper leg portion 235 contacts fluid-tightly the stopper wall 259, the space between the third liquid chamber 261 and the secondary liquid chamber 213 is closed.

Figure 20A:
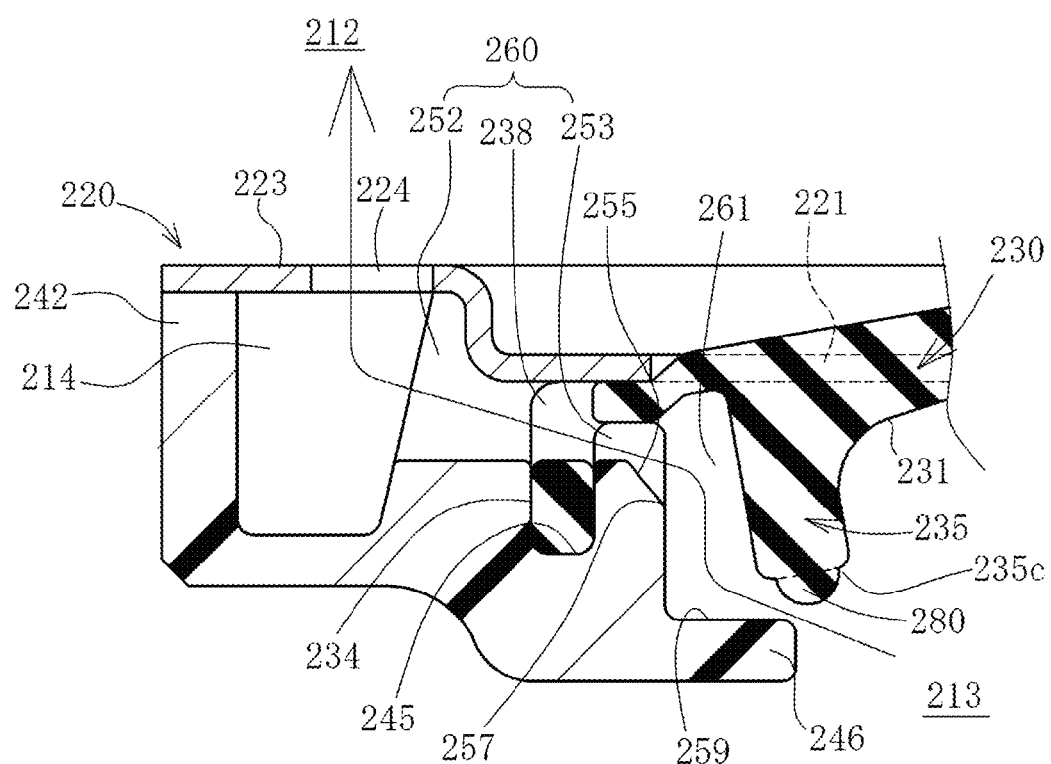
FIG. 20A is a view corresponding to FIG. 18A at the time of minus vibration due to the input of the excessive amplitude vibration.
Figure 20B:
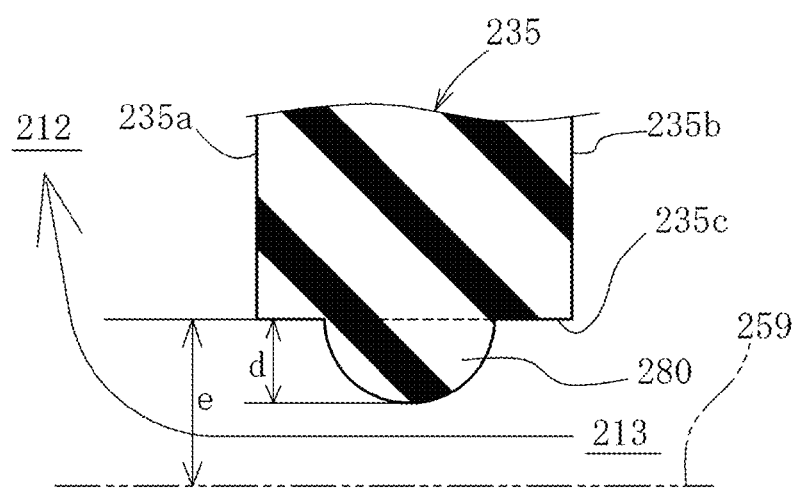
FIG. 20B is a view corresponding to FIG. 18C at the time of minus vibration due to the input of the excessive amplitude vibration.

FIGS. 20A and 20B show the state at the time of an abnormal condition, that is, at the time of the minus (−) vibration due to the input of the excessive amplitude vibration. At this time, as shown in FIG. 20-A, the elastic partition member 230 is elastically deformed upwardly on a large scale (toward the primary liquid chamber 212), and as shown in FIG. 20-B the lower surface 235c of the stopper leg portion 235 and the seal rib 280 each separate from the stopper wall 259 whereby the space between the third liquid chamber 261 and the secondary liquid chamber 213 is opened. Thus, the third liquid chamber 261 communicates with the secondary liquid chamber 213 through an annular gap formed between the seal rib 280 and the stopper wall 259. As a result, a large amount of the hydraulic liquid flows rapidly from the secondary liquid chamber 213 through the third liquid chamber 261 and the relief passage 260 into the primary liquid chamber 212 as shown by arrows, thereby making it possible to prevent the occurrence of the cavitation phenomenon.

Further, in the case of the minus (−) vibration in the normal condition in which the vibrations of the large amplitude and of the small amplitude other than the vibration of the excessive amplitude are inputted, the seal rib 280 comes in close contact with the stopper wall 259 so as to maintain the sealing capacity and keeps closing between the third liquid chamber 261 and the secondary liquid chamber 213. This can be performed by setting a projecting amount d of the seal rib 280 shown in FIG. 20-B. When a minimum necessary clearance between the lower surface 235c of the stopper leg portion 235 and the stopper wall 259 in the case of the minus (−) vibration of the excessive amplitude input is e, it is set such that a relation of e>d is held. The projecting amount d will be set to a length capable of keeping in close contact with the stopper wall 259.

With this structure, since the communication between the third liquid chamber 261 and the secondary liquid chamber 213 is closed at the time of the input of the large amplitude and the small amplitude, the high damping in the damping orifice passage 214 can be maintained, and only at the time of the input of the minus (−) vibration of the excessive amplitude in the abnormal condition, the communication between the third liquid chamber 261 and the secondary liquid chamber 213 is opened to allow the hydraulic liquid to leak from the secondary liquid chamber 213 to the primary liquid chamber 212, thereby enabling the occurrence of the cavitation phenomenon to be prevented.

Like this, in the case where the lower surface 235c of the stopper leg portion 235 is arranged to come in contact with and separate from the stopper wall 259 located under the lower surface 235c, the opening and closing between the third liquid chamber 261 and the secondary liquid chamber 213 is performed only by the movement in the principal vibration input direction Z of the stopper leg portion 235 so that the structure as an opening and closing valve between the relief passage 260 and the secondary liquid chamber 213 becomes simple and the operation can be reliably performed.

What is claimed is:

1. A liquid sealed vibration isolating device comprising a first mounting device mounted on a vibration source side, a second mounting device mounted on a vibration transmission side, a main elastic body of substantially conical shape being provided between the first and second mounting devices, a liquid chamber having a portion of a wall formed with the main elastic body, a partition member for partitioning the liquid chamber into a primary liquid chamber and a secondary liquid chamber and including a frame member, a damping orifice passage for absorbing low frequency vibration, which communicates between the primary liquid chamber and the secondary liquid chamber, an elastic diaphragm portion being provided on at least a portion of the partition member and elastically deformable to absorb a change in internal pressure of the primary liquid chamber, and a stopper leg portion integrally projecting from an outer circumferential portion on the secondary liquid chamber side of the elastic diaphragm portion in the direction of the secondary liquid chamber and having a projecting end to be pressed against the frame member provided for fixing a circumference of the elastic diaphragm portion, said outer circumferential portion forming a ring-shaped groove, wherein, in addition to the damping orifice passage, a second passage that communicates between the primary liquid chamber and the secondary liquid chamber is provided in the partition member, and the elastic diaphragm portion comprises a circumferential wall located on an outer circumferential side of the ring-shaped groove and fixed on the frame member and the stopper leg portion provided on an inner circumferential side of the ring-shaped groove.

2. The liquid sealed vibration isolating device according to claim 1, wherein the stopper leg portion has a substantially L-shaped cross section, and the projecting end which extends in the direction orthogonal to the input direction of a principal vibration is pressed against a support wall forming the circumferential wall of the frame member and slides in the input direction of the principal vibration, and wherein a surface of the support wall against which the stopper leg portion is pressed forms a pressed surface, and this pressed surface is formed with an inclined portion which is more expanded in diameter as it approaches the primary liquid chamber.

3. The liquid sealed vibration isolating device according to claim 2, wherein an end on the secondary liquid chamber side of the second passage is positioned to face the inclined portion, and the inclined portion is provided with a taper surface that inclines toward the end on the secondary liquid chamber side.

4. The liquid sealed vibration isolating device according to claim 2, wherein a surface of the stopper leg portion to be pressed against the support wall forms a pressing surface, and the pressing surface is formed with a taper surface which is gradually reduced in diameter toward the secondary liquid chamber.

5. The liquid sealed vibration isolating device according to claim 2, wherein the pressed surface of the support wall is formed with an round-shaped portion that is connected continuously with the inclined portion and that forms a deformation restraining portion of a curved surface shape for the stopper leg portion.

6. The liquid sealed vibration isolating device according to claim 1, wherein the second passage comprises a relief passage one end of which is opened in a region of the frame member facing the stopper leg portion and the other end of which is opened in the vicinity of a primary liquid chamber side opening of the damping orifice passage, and an opening of the relief passage provided on the side of the stopper leg portion is allowed to communicate with the secondary liquid chamber through the movement of the stopper leg portion only when the excessive amplitude vibration as to generate the cavitation phenomenon is inputted.

7. The liquid sealed vibration isolating device according to claim 1, further comprising an elastic partition member having a third liquid chamber that is surrounded by an outer circumferential portion of the elastic partition member, a support wall forming the circumferential wall of the frame member and the stopper leg portion, wherein the second passage communicates with the third liquid chamber.

8. The liquid sealed vibration isolating device according to claim 1, further comprising a circular rigid ring that is higher in rigidity than an elastic member forming the stopper leg portion, wherein the rigid ring is integrally implanted in the stopper leg portion.

9. The liquid sealed vibration isolating device according to claim 1, wherein the frame member is provided with a support wall that is formed on the outer circumferential side of the stopper leg portion and with a stopper wall that extends in the central direction at right angles to the input direction of a principal vibration, and wherein the stopper leg portion moves in the input direction of the principal vibration in response to the elastic deformation of the elastic diaphragm portion so as to come in contact with and separate from the stopper wall.

10. The liquid sealed vibration isolating device according to claim 9, further comprising a seal rib that is integrally formed on a surface of the stopper leg portion facing the stopper wall so as to project toward the stopper wall.

11. The liquid sealed vibration isolating device according to claim 3, wherein the pressing surface is formed with a taper surface which is gradually reduced in diameter toward the secondary liquid chamber.

12. The liquid sealed vibration isolating device according to claim 11, wherein the pressed surface of the support wall is formed with a round-shaped portion that is connected continuously with the inclined portion and that forms a deformation restraining portion of a curved surface shape for the stopper leg portion.

13. The liquid sealed vibration isolating device according to claim 3, wherein the pressed surface of the support wall is formed with an round-shaped portion that is connected continuously with the inclined portion and that forms a deformation restraining portion of a curved surface shape for the stopper leg portion.

14. The liquid sealed vibration isolating device according to claim 4, wherein the pressed surface of the support wall is formed with an round-shaped portion that is connected continuously with the inclined portion and that forms a deformation restraining portion of a curved surface shape for the stopper leg portion.

15. The liquid sealed vibration isolating device according to claim 2, wherein the second passage comprises a relief passage one end of which is opened in a region of the frame member facing the stopper leg portion and the other end of which is opened in the vicinity of a primary liquid chamber side opening of the damping orifice passage, and an opening of the relief passage provided on the side of the stopper leg portion is allowed to communicate with the secondary liquid chamber through the movement of the stopper leg portion only when such an excessive amplitude vibration as to generate the cavitation phenomenon is inputted.

16. The liquid sealed vibration isolating device according to claim 2, further comprising an elastic partition member having a third liquid chamber that is surrounded by an outer circumferential portion of the elastic partition member, the support wall of the frame member and the stopper leg portion, wherein the second passage communicates with the third liquid chamber.

17. The liquid sealed vibration isolating device according to claim 2, further comprising a circular rigid ring that is higher in rigidity than an elastic member forming the stopper leg portion, wherein the rigid ring is integrally implanted in the stopper leg portion.

18. The liquid sealed vibration isolating device according to claim 6, wherein the frame member is provided with a support wall that is formed on the outer circumferential side of the stopper leg portion and with a stopper wall that extends in the central direction at right angles to the input direction of a principal vibration, and wherein the stopper leg portion moves in the input direction of the principal vibration in response to the elastic deformation of the elastic diaphragm portion so as to come in contact with and separate from the stopper wall.

19. The liquid sealed vibration isolating device according to claim 7, wherein the frame member is provided with the support wall that is formed on the outer circumferential side of the stopper leg portion and with a stopper wall that extends in the central direction at right angles to the input direction of a principal vibration, and wherein the stopper leg portion moves in the input direction of the principal vibration in response to the elastic deformation of the elastic diaphragm portion so as to come in contact with and separate from the stopper wall.

20. The liquid sealed vibration isolating device according to claim 8, wherein the frame member is provided with a support wall that is formed on the outer circumferential side of the stopper leg portion and with a stopper wall that extends in the central direction at right angles to the input direction of a principal vibration, and wherein the stopper leg portion moves in the input direction of the principal vibration in response to the elastic deformation of the elastic diaphragm portion so as to come in contact with and separate from the stopper wall.

* * * * *